United States Patent
Yamamoto et al.

(10) Patent No.: US 11,307,392 B2
(45) Date of Patent: Apr. 19, 2022

(54) VARIABLE MAGNIFICATION OPTICAL SYSTEM, IMAGING APPARATUS, AND METHOD FOR MANUFACTURING VARIABLE MAGNIFICATION OPTICAL SYSTEM

(71) Applicant: Nikon Corporation, Tokyo (JP)

(72) Inventors: Hiroshi Yamamoto, Kawasaki (JP); Satoru Shibata, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 16/886,757

(22) Filed: May 28, 2020

(65) Prior Publication Data

US 2020/0292798 A1    Sep. 17, 2020

Related U.S. Application Data

(60) Division of application No. 14/953,374, filed on Nov. 29, 2015, now Pat. No. 10,698,188, which is a
(Continued)

(30) Foreign Application Priority Data

May 31, 2013  (JP) ................................. 2013-116186
May 31, 2013  (JP) ................................. 2013-116187
(Continued)

(51) Int. Cl.
*G02B 15/14* (2006.01)
*G02B 27/64* (2006.01)
*G02B 13/00* (2006.01)

(52) U.S. Cl.
CPC .... *G02B 15/144113* (2019.08); *G02B 13/009* (2013.01); *G02B 15/144105* (2019.08); *G02B 27/646* (2013.01)

(58) Field of Classification Search
CPC ............... G02B 15/144105; G02B 15/144113
See application file for complete search history.

(56) References Cited

U.S. PATENT DOCUMENTS

| 5,107,371 A | 4/1992 | Shibata et al. |
| 5,790,309 A | 8/1998 | Ohtake |

(Continued)

FOREIGN PATENT DOCUMENTS

| JP | 04-096012 A | 3/1992 |
| JP | 05-224125 A | 9/1993 |

(Continued)

OTHER PUBLICATIONS

English Translation of International Preliminary Report on Patentability from International Patent Application No. PCT/JP2014/063986, dated Dec. 10, 2015.
(Continued)

*Primary Examiner* — Robert E. Tallman
(74) *Attorney, Agent, or Firm* — SGPatents PLLC

(57) ABSTRACT

Provided is a variable magnification optical system comprising, in order from an object side along an optical axis, a first lens group G1 having positive refractive power, a second lens group G2 having negative refractive power, a third lens group G3 having positive refractive power, and a fourth lens group G4; upon zooming from a wide angle end state to a telephoto end state, a distance between the first lens group G1 and the second lens group G2 being varied, a distance between the second lens group G2 and the third lens group G3 being varied, and a distance between the third lens group and the fourth lens group being varied; the third lens group G3 comprising, in order from the object side along the optical axis, a 3a-th lens group G3a having positive refractive power, an aperture S, and a 3b-th lens group G3b having positive refractive power; a lens group having negative refractive power within the 3b-th lens group G3b being used
(Continued)

as a vibration reduction lens group and moved so as to include a component in a direction orthogonal to the optical axis, whereby image plane correction is performed when image blurring occurs; and predetermined conditions being satisfied. Whereby, a small-size and high-performance variable magnification optical system, capable of realizing a small variation in aberration and attaining a sufficient brightness even in the telephoto state, an imaging apparatus, and a method for manufacturing the variable magnification optical system are provided.

14 Claims, 22 Drawing Sheets

Related U.S. Application Data continuation of application No. PCT/JP2014/063986, filed on May 27, 2014.

(30) Foreign Application Priority Data

May 31, 2013 (JP) ................................ 2013-116188
May 31, 2013 (JP) ................................ 2013-116189

(56) References Cited

U.S. PATENT DOCUMENTS

| | | |
|---|---|---|
| 6,010,537 A | 1/2000 | Konno et al. |
| 2004/0223070 A1 | 11/2004 | Shirasuna |
| 2007/0217026 A1 | 9/2007 | Nishimura |
| 2007/0229985 A1 | 10/2007 | Nakatani et al. |
| 2007/0242365 A1 | 10/2007 | Kushida et al. |
| 2008/0137218 A1 | 6/2008 | Omichi |
| 2010/0091171 A1 | 4/2010 | Miyazaki et al. |
| 2011/0080652 A1 | 4/2011 | Nakayama et al. |
| 2011/0149118 A1 | 6/2011 | Misaka |
| 2012/0013995 A1 | 1/2012 | Saruwatari |
| 2012/0105966 A1 | 5/2012 | Obama et al. |
| 2012/0307367 A1* | 12/2012 | Bito ............... G02B 13/18 359/557 |
| 2013/0169856 A1 | 7/2013 | Misaka |
| 2014/0211029 A1 | 7/2014 | Okumura |
| 2015/0146024 A1 | 5/2015 | Takeuchi |

FOREIGN PATENT DOCUMENTS

| | | |
|---|---|---|
| JP | 08-101361 A | 4/1996 |
| JP | 3890574 B2 | 3/1997 |
| JP | 11-064728 A | 3/1999 |
| JP | 2004-333770 A | 11/2004 |
| JP | 2007-248952 A | 9/2007 |
| JP | 2007-264173 A | 10/2007 |
| JP | 2007-264390 A | 10/2007 |
| JP | 2007-286446 A | 11/2007 |
| JP | 2008-039838 A | 2/2008 |
| JP | 2008-145529 A | 6/2008 |
| JP | 2009-251114 A | 10/2009 |
| JP | 2010-113179 A | 5/2010 |
| JP | 2011-081112 A | 4/2011 |
| JP | 2011-128371 A | 6/2011 |

OTHER PUBLICATIONS

International Search Report from International Patent Application No. PCT/JP2014/063986, dated Sep. 9, 2014.
Office Action dated May 14, 2020, in Chinese Patent Application No. 201810707953.X.

* cited by examiner

VARIABLE MAGNIFICATION OPTICAL SYSTEM, IMAGING APPARATUS, AND METHOD FOR MANUFACTURING VARIABLE MAGNIFICATION OPTICAL SYSTEM

TECHNICAL FIELD

The present invention relates to a variable magnification optical system having a vibration reduction function, suitable for a photographing camera, an electronic still camera, a video camera or the like, an imaging apparatus equipped with the variable magnification optical system, and a method for manufacturing variable magnification optical system.

BACKGROUND ART

There has been proposed a variable magnification optical system suitable for a photographing camera, an electronic still camera, a video camera or the like, which has a vibration reduction function and an entire lens system reduced in size with a back focus thereof shortened. For example, see Japanese Patent Gazette No. 3890574.

PRIOR ART REFERENCE

Patent Document

Patent Document 1: Japanese Patent Gazette No. 3890574

SUMMARY OF THE INVENTION

Problems to be Solved by the Invention

However, in the conventional variable magnification optical system, there has been a problem that a lens brightness is extremely decreased in the telephoto state while the entire lens system is configured with a relatively small size.

The present invention is made in view of the above-described problem, and has an object to provide a small-sized and high performance variable magnification optical system, capable of realizing a small variation in aberration and attaining a sufficient brightness even in the telephoto state, an imaging apparatus equipped with the variable magnification optical system, and a method for manufacturing the variable magnification optical system.

Means of Solving the Problems

In order to achieve the above-mentioned object, a variable magnification optical system relating to a first aspect of the present invention comprises, in order from an object side along an optical axis, a first lens group having positive refractive power, a second lens group having negative refractive power, a third lens group having positive refractive power, and a fourth lens group; upon zooming from a wide angle end state to a telephoto end state, a distance between the first lens group and the second lens group being varied, a distance between the second lens group and the third lens group being varied, and a distance between the third lens group and the fourth lens group being varied; the third lens group comprising, in order from the object side along the optical axis, a 3a-th lens group having positive refractive power, an aperture, and a 3b-th lens group having positive refractive power; a lens group having negative refractive power within the 3b-th lens group being used as a vibration reduction lens group and moved so as to include a component in a direction orthogonal to the optical axis, whereby image plane correction is performed when image blurring occurs; and the conditions of the following expressions being satisfied:

$|f3b/f4|<2.00$ $|fvr/f4|<1.00$ where f3b denotes a focal length of the 3b-th lens group, f4 denotes a focal length of the fourth lens group, and fvr denotes a focal length of the vibration reduction lens group.

Further, an imaging apparatus relating to a second aspect of the present invention is equipped with the variable magnification optical system relating to the first aspect of the present invention.

Further, a variable magnification optical system relating to a third aspect of the present invention comprises, in order from an object side along an optical axis, a first lens group having positive refractive power, a second lens group having negative refractive power, a third lens group having positive refractive power, and a fourth lens group; upon zooming from a wide angle end state to a telephoto end state, a distance between the first lens group and the second lens group being varied, a distance between the second lens group and the third lens group being varied, and a distance between the third lens group and the fourth lens group being varied; the third lens group comprising, in order from the object side along the optical axis, a 3a-th lens group having positive refractive power, an aperture, and a 3b-th lens group having positive refractive power; a lens group having negative refractive power within the 3b-th lens group being used as a vibration reduction lens group and moved so as to include a component in a direction orthogonal to the optical axis, whereby image plane correction is performed when image blurring occurs; and the conditions of the following expressions being satisfied:

$|f3a/f4|<0.53$ $|fvr/f4|<1.00$ where f3a denotes a focal length of the 3a-th lens group, f4 denotes a focal length of the fourth lens group, and fvr denotes a focal length of the vibration reduction lens group.

Further, an imaging apparatus relating to a fourth aspect of the present invention is equipped with the variable magnification optical system relating to the third aspect of the present invention.

Further, a variable magnification optical system relating to a fifth aspect of the present invention comprises, in order from an object side along an optical axis, a first lens group having positive refractive power, a second lens group having negative refractive power, a third lens group having positive refractive power, and a fourth lens group; upon zooming from a wide angle end state to a telephoto end state, the first lens group, the second lens group, the third lens group and the fourth lens group being moved along the optical axis, respectively; the first lens group comprising one negative lens and one positive lens; the third lens group comprising, in order from the object side along the optical axis, a 3a-th lens group having positive refractive power, an aperture, and a 3b-th lens group having positive refractive power; and the condition of the following expression being satisfied:

$|f3a/f4|<0.540$ where f3a denotes a focal length of the 3a-th lens group and f4 denotes a focal length of the fourth lens group.

Further, an imaging apparatus relating to a sixth aspect of the present invention is equipped with the variable magnification optical system relating to the fifth aspect of the present invention.

Further, a variable magnification optical system relating to a seventh aspect of the present invention comprises, in order from an object side along an optical axis, a first lens group having positive refractive power, a second lens group having negative refractive power, a third lens group having positive refractive power, and a fourth lens group; upon zooming from a wide angle end state to a telephoto end state, the first lens group, the second lens group, the third lens group and the fourth lens group being moved along the optical axis, respectively; the first lens group comprising one negative lens and one positive lens; the third lens group comprising, in order from the object side along the optical axis, a 3a-th lens group having positive refractive power, an aperture, and a 3b-th lens group having positive refractive power; the 3b-th lens group comprising at least one negative lens component; and the conditions of the following expressions being satisfied:

$$|f3a/f4|<1.00$$

$$0.700<(-f3bn)/f3a<1.500$$

where f3a denotes a focal length of the 3a-th lens group, f4 denotes a focal length of the fourth lens group, and f3bn denotes a focal length of the negative lens component on the most image side within the 3b-th lens group.

Further, an imaging apparatus relating to an eighth aspect of the present invention is equipped with the variable magnification optical system relating to the seventh aspect of the present invention.

Further, a method for manufacturing a variable magnification optical system, relating to a ninth aspect of the present invention, is a method for manufacturing a variable magnification optical system comprising, in order from an object side along an optical axis, a first lens group having positive refractive power, a second lens group having negative refractive power, a third lens group having positive refractive power, and a fourth lens group; the method comprising: constructing, upon zooming from a wide angle end state to a telephoto end state, a distance between the first lens group and the second lens group to be varied, a distance between the second lens group and the third lens group to be varied, and a distance between the third lens group and the fourth lens group to be varied; arranging the third lens group to comprise, in order from the object side along the optical axis, a 3a-th lens group having positive refractive power, an aperture, and a 3b-th lens group having positive refractive power; constructing a lens group having negative refractive power within the 3b-th lens group to be used as a vibration reduction lens group and moved so as to include a component in a direction orthogonal to the optical axis, whereby image plane correction is performed when image blurring occurs; and constructing the conditions of the following expressions to be satisfied:

$$|f3b/f4|<2.00$$

$$|fvr/f4|<1.00$$

where f3b denotes a focal length of the 3b-th lens group, f4 denotes a focal length of the fourth lens group, and fvr denotes a focal length of the vibration reduction lens group.

Further, a method for manufacturing a variable magnification optical system, relating to a tenth aspect of the present invention, is a method for manufacturing a variable magnification optical system comprising, in order from an object side along an optical axis, a first lens group having positive refractive power, a second lens group having negative refractive power, a third lens group having positive refractive power, and a fourth lens group; the method comprising: constructing, upon zooming from a wide angle end state to a telephoto end state, a distance between the first lens group and the second lens group to be varied, a distance between the second lens group and the third lens group to be varied, and a distance between the third lens group and the fourth lens group to be varied; arranging the third lens group to comprise, in order from the object side along the optical axis, a 3a-th lens group having positive refractive power, an aperture, and a 3b-th lens group having positive refractive power; constructing a lens group having negative refractive power within the 3b-th lens group to be used as a vibration reduction lens group and moved so as to include a component in a direction orthogonal to the optical axis, whereby image plane correction is performed when image blurring occurs; and constructing the conditions of the following expressions to be satisfied:

$$|f3a/f4|<0.53$$

$$|fvr/f4|<1.00$$

where f3a denotes a focal length of the 3a-th lens group, f4 denotes a focal length of the fourth lens group, and fvr denotes a focal length of the vibration reduction lens group.

Further, a method for manufacturing a variable magnification optical system, relating to an eleventh aspect of the present invention, is a method for manufacturing a variable magnification optical system comprising, in order from an object side along an optical axis, a first lens group having positive refractive power, a second lens group having negative refractive power, a third lens group having positive refractive power, and a fourth lens group; the method comprising: constructing, upon zooming from a wide angle end state to a telephoto end state, the first lens group, the second lens group, the third lens group and the fourth lens group to be moved along the optical axis, respectively; arranging the first lens group to comprise one negative lens and one positive lens; arranging the third lens group to comprise, in order from the object side along the optical axis, a 3a-th lens group having positive refractive power, an aperture, and a 3b-th lens group having positive refractive power; and constructing the condition of the following expression to be satisfied:

$$|f3a/f4|<0.540$$

where f3a denotes a focal length of the 3a-th lens group, and f4 denotes a focal length of the fourth lens group.

Further, in a method for manufacturing a variable magnification optical system, relating to a twelfth aspect of the present invention, is a method for manufacturing a variable magnification optical system comprising, in order from an object side along an optical axis, a first lens group having positive refractive power, a second lens group having negative refractive power, a third lens group having positive refractive power, and a fourth lens group; the method comprising: constructing, upon zooming from a wide angle end state to a telephoto end state, the first lens group, the second lens group, the third lens group and the fourth lens group to be moved along the optical axis, respectively; arranging the first lens group to comprise one negative lens and one positive lens; arranging the third lens group to comprise, in order from the object side along the optical axis, a 3a-th lens group having positive refractive power, an aperture, and a 3b-th lens group having positive refractive power; arranging the 3b-th lens group to include at least one negative lens component; and constructing the conditions of the following expressions to be satisfied:

$$|f3a/f4|<1.00$$

$$0.700<(-f3bn)/f3a<1.500$$

where f3a denotes a focal length of the 3a-th lens group, f4 denotes a focal length of the fourth lens group, and f3bn denotes a focal length of the negative lens component on the most image side within the 3b-th lens group.

Effect of the Invention

According to the present invention, there can be provided a small-sized and high performance variable magnification optical system, capable of realizing a small variation in aberration and attaining a sufficient brightness even in the telephoto state, an imaging apparatus equipped with the variable magnification optical system, and a method for manufacturing the variable magnification optical system.

EMBODIMENTS FOR CARRYING OUT THE INVENTION

Figure 1:
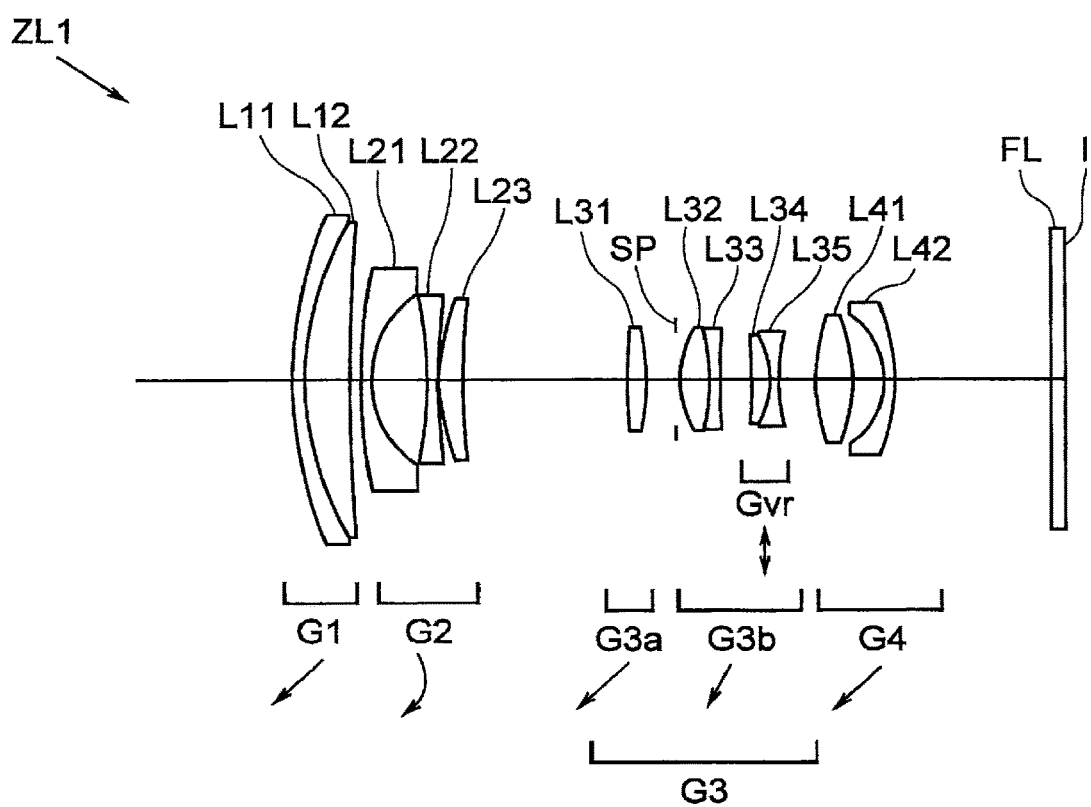
FIG. 1 is a view showing a configuration of a variable magnification optical system relating to a first Example in common according to the first to fourth embodiments of the present invention.

A variable magnification optical system, an imaging apparatus, and a method for manufacturing the variable magnification optical system, according to a first embodiment of the present invention are explained below.

At first, a variable magnification optical system according to the first embodiment of the present invention is explained. The variable magnification optical system according to the first embodiment of the present invention comprises, in order from an object side along an optical axis, a first lens group having positive refractive power, a second lens group having negative refractive power, a third lens group having positive refractive power, and a fourth lens group; upon zooming from a wide angle end state to a telephoto end state, a distance between the first lens group and the second lens group being varied, a distance between the second lens group and the third lens group being varied, and a distance between the third lens group and the fourth lens group being varied. With this configuration, it is possible to realize an optical system capable of zooming and realize a high optical performance by suppressing a variation in curvature of field associated with the zooming.

Further, based on such configuration, in the variable magnification optical system according to the first embodiment of the present application, the third lens group comprises, in order from the object side along the optical axis, a 3a-th lens group having positive refractive power, an aperture, and a 3b-th lens group having positive refractive power; and a lens group having negative refractive power within the 3b-th lens group is used as a vibration reduction lens group and moved so as to include a component in a direction orthogonal to the optical axis, whereby image plane correction, that is, vibration reduction is performed when image blurring occurs. With this configuration, it is possible to satisfactorily correct a coma aberration upon image plane correction.

Further, based on such configuration, the variable magnification optical system according to the first embodiment of the present application can realize downsizing and enhancement of the performance by satisfying the following conditional expressions (1) and (2):

$$|f3b/f4|<2.00 \qquad (1)$$

$$|fvr/f4|<1.00 \qquad (2)$$

where f3b denotes a focal length of the 3b-th lens group, f4 denotes a focal length of the fourth lens group, and fvr denotes a focal length of the vibration reduction lens group.

The conditional expression (1) defines the focal lengths of the 3b-th lens group and the fourth lens group. With satisfying the conditional expression (1), it is possible to realize a suitable optical system.

When the value of $|f3b/f4|$ is equal to or exceeds the higher limit value of the conditional expression (1), the focal length of the fourth lens group becomes short and thus it is difficult to correct a coma aberration and curvature of field. Meanwhile, in order to attain the advantageous effect of the present application surely, it is preferable to set the higher limit value of the conditional expression (1) to 1.30. Further, in order to attain the advantageous effect of the present application more surely, it is preferable to set the higher limit value of the conditional expression (1) to 1.00.

Further, in order to attain the advantageous effect of the present application surely, it is preferable that the conditional expression (1) further satisfies the condition, $0.10<|f3b/f4|$. When the value of $|f3b/f4|$ is equal to or falls below the lower limit value of the conditional expression (1), the focal length of the 3b-th lens group becomes short and thus it is difficult to correct a spherical aberration. Meanwhile, in order to attain the advantageous effect of the present application more surely, it is preferable to set the lower limit value of the conditional expression (1) to 0.30. Further, in order to attain the advantageous effect of the present application still more surely, it is preferable to set the lower limit value of the conditional expression (1) to 0.40.

The conditional expression (2) defines the focal lengths of the vibration reduction lens group and the fourth lens group. With satisfying the conditional expression (2), it is possible to maintain an excellent optical performance upon conducting vibration reduction.

When the value of $|f3b/f4|$ is equal to or exceeds the higher limit value of the conditional expression (2), a movement amount of a lens for vibration reduction increases, so that a size of the vibration reduction lens group increases and it is difficult to control the vibration reduction lens group. In addition, it is impossible to correct curvature of field satisfactorily. Meanwhile, in order to attain the advantageous effect of the present application surely, it is preferable to set the higher limit value of the conditional expression (2) to 0.9.

Further, in order to attain the advantageous effect of the present application surely, it is preferable that the conditional expression (2) further satisfies the condition, $0.10<|fvr/f4|$. When the value of $|fvr/f4|$ is equal to or falls below the lower limit value of the conditional expression (2), it is difficult to correct a coma aberration and image plane distortion caused upon decentering of the vibration reduction lens. Meanwhile, in order to attain the advantageous effect of the present application more surely, it is preferable to set the lower limit value of the conditional expression (2) to 0.20.

Further, in the variable magnification optical system according to the first embodiment of the present invention, it is preferable that the first lens group is moved toward the object side with respect to an image plane along the optical axis upon zooming from the wide angle end state to the telephoto end state. By such configuration, it is possible to realize downsizing and efficient zooming. In addition, since it is possible to properly maintain powers of the second lens group and the lens groups subsequent thereto, a spherical aberration and curvature of field can be corrected satisfactorily.

Further, in the variable magnification optical system according to the first embodiment of the present invention, it is preferable that a distance between the 3a-th lens group and the 3b-th lens group increases upon zooming from the wide angle end state to the telephoto end state. By such configuration, it is possible to satisfactorily correct a variation in spherical aberration associated with zooming.

Further, in the variable magnification optical system according to the first embodiment of the present invention, it is preferable that the first lens group comprises one negative lens and one positive lens. By such configuration, it is possible to satisfactorily correct lateral chromatic aberration, lessening a total length of an optical system. In addition, when one more positive lens is added, it is possible to correct a coma aberration and curvature of field more satisfactorily. However, a total length of the optical system increases and thus it is difficult to realize downsizing.

Further, in the variable magnification optical system according to the first embodiment of the present invention, it is preferable that the following conditional expression (3) is satisfied:

$$2.00<f1/(-f2)<6.20$$

where f1 denotes a focal length of the first lens group, and f2 denotes a focal length of the second lens group.

The conditional expression (3) defines the focal lengths of the first lens group and the second lens group. With satisfying the conditional expression (3), it is possible to realize a small-sized optical system, maintaining an excellent optical performance upon zooming.

When the value of $f1/(-f2)$ is equal to or exceeds the higher limit value of the conditional expression (3), a movement amount of the first lens group increases, so that it is difficult to downsize an optical system. In addition, powers of the second lens group and the lens groups subsequent thereto increase, so that it is impossible to satisfactorily correct curvature of field upon zooming. Meanwhile, in order to attain the advantageous effect of the present application surely, it is preferable to set the higher limit value of the conditional expression (3) to 6.00.

When the value of f1/(−f2) is equal to or falls below the lower limit value of the conditional expression (3), the focal length of the first lens group becomes too short, so that it is impossible to correct a spherical aberration satisfactorily. Meanwhile, in order to attain the advantageous effect of the present application surely, it is preferable to set the lower limit value of the conditional expression (3) to 2.50. In addition, in order to attain the advantageous effect of the present application more surely, it is preferable to set the lower limit value of the conditional expression (3) to 3.00.

Further, in the variable magnification optical system according to the first embodiment of the present invention, it is preferable that the vibration reduction lens group comprises at least one negative lens and one positive lens. By such configuration, it is possible to satisfactorily correct chromatic aberration caused upon decentering of the vibration reduction lens.

Further, in the variable magnification optical system according to the first embodiment of the present invention, it is preferable that the vibration reduction lens group is a cemented lens. By such configuration, it is possible to satisfactorily correct chromatic aberration caused upon decentering of the vibration reduction lens.

Further, in the variable magnification optical system according to the first embodiment of the present invention, it is preferable that the second lens group comprises three lenses. In the case where the second lens group comprises two lenses, it is difficult to correct a coma aberration and lateral chromatic aberration upon zooming. In addition, in the case where the second lens group comprises four or more lenses, a thickness of the second lens group on the optical axis increases and thus a total length becomes long, so that it is difficult to realize downsizing.

Further, an imaging apparatus according to the first embodiment of the present invention is equipped with the variable magnification optical system configured as abovementioned. With this configuration, it is possible to realize an imaging apparatus equipped with a high optical performance.

Further, a method for manufacturing a variable magnification optical system, according to the first embodiment of the present invention, is a method for manufacturing a variable magnification optical system comprising, in order from an object side along an optical axis, a first lens group having positive refractive power, a second lens group having negative refractive power, a third lens group having positive refractive power, and a fourth lens group; the method comprising: constructing, upon zooming from a wide angle end state to a telephoto end state, a distance between the first lens group and the second lens group to be varied, a distance between the second lens group and the third lens group to be varied, and a distance between the third lens group and the fourth lens group to be varied; arranging the third lens group to comprise, in order from the object side along the optical axis, a 3a-th lens group having positive refractive power, an aperture, and a 3b-th lens group having positive refractive power; constructing a lens group having negative refractive power within the 3b-th lens group to be used as a vibration reduction lens group and moved so as to include a component in a direction orthogonal to the optical axis, whereby image plane correction is performed when image blurring occurs; and constructing the conditions of the following expressions to be satisfied:

$$|f3b/f4|<2.00 \qquad (1)$$

$$|fvr/f4|<1.00 \qquad (2)$$

where f3b denotes a focal length of the 3b-th lens group, f4 denotes a focal length of the fourth lens group, and fvr denotes a focal length of the vibration reduction lens group.

With this method for manufacturing a variable magnification optical system, according to the first embodiment of the present invention, it is possible to manufacture a variable magnification optical system equipped with a high optical performance.

A variable magnification optical system, an imaging apparatus, and a method for manufacturing the variable magnification optical system, according to a second embodiment of the present invention are explained below.

At first, a variable magnification optical system according to the second embodiment of the present invention is explained. The variable magnification optical system according to the second embodiment of the present invention comprises, in order from an object side along an optical axis, a first lens group having positive refractive power, a second lens group having negative refractive power, a third lens group having positive refractive power, and a fourth lens group; upon zooming from a wide angle end state to a telephoto end state, the first lens group being moved toward the object side with respect to an image plane along the optical axis, a distance between the first lens group and the second lens group being varied, a distance between the second lens group and the third lens group being varied, and a distance between the third lens group and the fourth lens group being varied. With this configuration, it is possible to realize an optical system capable of downsizing and efficient zooming, and also to realize a high optical performance by suppressing a variation in curvature of field associated with the zooming. In addition, since it is possible to properly maintain powers of the second lens group and the lens groups subsequent thereto, a spherical aberration and curvature of field can be corrected satisfactorily.

Further, based on such configuration, in the variable magnification optical system according to the second embodiment of the present application, the third lens group comprises, in order from the object side along the optical axis, a 3a-th lens group having positive refractive power, an aperture, and a 3b-th lens group having positive refractive power; and a lens group having negative refractive power within the 3b-th lens group is used as a vibration reduction lens group and moved so as to include a component in a direction orthogonal to the optical axis, whereby image plane correction, that is, vibration reduction is performed when image blurring occurs. With this configuration, it is possible to satisfactorily correct a coma aberration upon image plane correction.

Further, based on such configuration, the variable magnification optical system according to the second embodiment of the present application can realize downsizing and enhancement of the performance by satisfying the following conditional expressions (4) and (2):

$$|f3a/f4|<0.53 \qquad (4)$$

$$|fvr/f4|<1.00 \qquad (2)$$

where f3a denotes a focal length of the 3a-th lens group, f4 denotes a focal length of the fourth lens group, and fvr denotes a focal length of the vibration reduction lens group.

The conditional expression (4) defines the focal lengths of the 3a-th lens group and the fourth lens group. With satisfying the conditional expression (4), it is possible to realize satisfactory correction of aberration and downsizing.

When the value of |f3a/f4| is equal to or exceeds the higher limit value of the conditional expression (4), the focal length of the fourth lens group becomes short and thus it is difficult to correct a coma aberration and curvature of field. Meanwhile, in order to attain the advantageous effect of the present application surely, it is preferable to set the higher limit value of the conditional expression (4) to 0.48. Further, in order to attain the advantageous effect of the present application more surely, it is preferable to set the higher limit value of the conditional expression (4) to 0.43.

Further, in order to attain the advantageous effect of the present application surely, it is preferable that the conditional expression (4) further satisfies the condition, 0.20<|f3a/f4|. When the value of |f3a/f4| is equal to or falls below the lower limit value of the conditional expression (4), the focal length of the 3a-th lens group becomes short and thus it is difficult to correct a spherical aberration. When it is intended to correct a spherical aberration satisfactorily, the increase of the number of lenses is required. In that case, downsizing as an object of the present invention cannot be realized. Meanwhile, in order to attain the advantageous effect of the present application more surely, it is preferable to set the lower limit value of the conditional expression (4) to 0.25. Further, in order to attain the advantageous effect of the present application still more surely, it is preferable to set the lower limit value of the conditional expression (4) to 0.28.

The conditional expression (2) defines the focal lengths of the vibration reduction lens group and the fourth lens group. With satisfying the conditional expression (2), it is possible to maintain an excellent optical performance upon conducting vibration reduction.

When the value of |fvr/f4| is equal to or exceeds the higher limit value of the conditional expression (2), a movement amount of a lens for vibration reduction increases, so that a size of the vibration reduction lens group increases and it is difficult to control the vibration reduction lens group. In addition, it is impossible to correct curvature of field satisfactorily. Meanwhile, in order to attain the advantageous effect of the present application surely, it is preferable to set the higher limit value of the conditional expression (2) to 0.90.

Further, in order to attain the advantageous effect of the present application surely, it is preferable that the conditional expression (2) further satisfies the condition, 0.10<|fvr/f4|. When the value of |fvr/f4| is equal to or falls below the lower limit value of the conditional expression (2), it is difficult to correct a coma aberration and image plane distortion caused upon decentering of the vibration reduction lens. Meanwhile, in order to attain the advantageous effect of the present application more surely, it is preferable to set the lower limit value of the conditional expression (2) to 0.20.

Further, in the variable magnification optical system according to the second embodiment of the present invention, it is preferable that a distance between the 3a-th lens group and the 3b-th lens group increases upon zooming from the wide angle end state to the telephoto end state. By such configuration, it is possible to satisfactorily correct a variation in spherical aberration associated with zooming.

Further, in the variable magnification optical system according to the second embodiment of the present invention, it is preferable that the first lens group comprises one negative lens and one positive lens. By such configuration, it is possible to satisfactorily correct lateral chromatic aberration, lessening a total length of an optical system. In addition, when one more positive lens is added, it is possible to correct a coma aberration and curvature of field more satisfactorily. However, a total length of the optical system increases and thus it is difficult to realize downsizing.

Further, in the variable magnification optical system according to the second embodiment of the present invention, it is preferable that the following conditional expression (3) is satisfied:

$$2.00<f1/(-f2)<6.20$$

where f1 denotes a focal length of the first lens group, and f2 denotes a focal length of the second lens group.

The conditional expression (3) defines the focal lengths of the first lens group and the second lens group. With satisfying the conditional expression (3), it is possible to realize a small-sized optical system, maintaining an excellent optical performance upon zooming.

When the value of f1/(−f2) is equal to or exceeds the higher limit value of the conditional expression (3), a movement amount of the first lens group increases, so that it is difficult to downsize an optical system. In addition, powers of the second lens group and the lens groups subsequent thereto increase, so that it is impossible to satisfactorily correct curvature of field upon zooming. Meanwhile, in order to attain the advantageous effect of the present application surely, it is preferable to set the higher limit value of the conditional expression (3) to 6.0.

When the value of f1/(−f2) is equal to or falls below the lower limit value of the conditional expression (3), the focal length of the first lens group becomes too short, so that it is impossible to satisfactorily correct a spherical aberration. Meanwhile, in order to attain the advantageous effect of the present application surely, it is preferable to set the lower limit value of the conditional expression (3) to 2.5. In addition, in order to attain the advantageous effect of the present application more surely, it is preferable to set the lower limit value of the conditional expression (3) to 3.0.

Further, in the variable magnification optical system according to the second embodiment of the present invention, it is preferable that the vibration reduction lens group comprises at least one negative lens and one positive lens. By such configuration, it is possible to satisfactorily correct chromatic aberration caused upon decentering of the vibration reduction lens.

Further, in the variable magnification optical system according to the second embodiment of the present invention, it is preferable that the vibration reduction lens group is a cemented lens. By such configuration, it is possible to satisfactorily correct chromatic aberration caused upon decentering of the vibration reduction lens.

Further, in the variable magnification optical system according to the second embodiment of the present invention, it is preferable that the second lens group comprises three lenses. In the case where the second lens group comprises two lenses, it is difficult to correct a coma aberration and lateral chromatic aberration upon zooming. In addition, in the case where the second lens group comprises four or more lenses, a thickness of the second lens group on the optical axis increases and thus a total length becomes long, so that it is difficult to realize downsizing.

Further, an imaging apparatus according to the second embodiment of the present invention is equipped with the variable magnification optical system configured as abovementioned. With this configuration, it is possible to realize an imaging apparatus equipped with a high optical performance.

Further, a method for manufacturing a variable magnification optical system, according to the second embodiment of the present invention, is a method for manufacturing a variable magnification optical system comprising, in order from an object side along an optical axis, a first lens group having positive refractive power, a second lens group having negative refractive power, a third lens group having positive refractive power, and a fourth lens group; the method comprising: constructing such that, upon zooming from a wide angle end state to a telephoto end state, the first lens group is moved toward the object side with respect to an image plane along the optical axis, a distance between the first lens group and the second lens group is varied, a distance between the second lens group and the third lens group is varied, and a distance between the third lens group and the fourth lens group is varied; arranging the third lens group to comprise, in order from the object side along the optical axis, a 3a-th lens group having positive refractive power, an aperture, and a 3b-th lens group having positive refractive power; constructing a lens group having negative refractive power within the 3b-th lens group to be used as a vibration reduction lens group and moved so as to include a component in a direction orthogonal to the optical axis, whereby image plane correction is performed when image blurring occurs; and constructing the conditions of the following expressions to be satisfied:

$$|f3a/f4|<0.53 \tag{4}$$

$$|fvr/f4|<1.00 \tag{2}$$

where f3a denotes a focal length of the 3a-th lens group, f4 denotes a focal length of the fourth lens group, and fvr denotes a focal length of the vibration reduction lens group.

With this method for manufacturing a variable magnification optical system, according to the second embodiment of the present invention, it is possible to manufacture a variable magnification optical system equipped with a high optical performance.

A variable magnification optical system, an imaging apparatus, and a method for manufacturing the variable magnification optical system, according to a third embodiment of the present invention are explained below.

At first, a variable magnification optical system according to the third embodiment of the present invention is explained. The variable magnification optical system according to the third embodiment of the present invention comprises, in order from an object side along an optical axis, a first lens group having positive refractive power, a second lens group having negative refractive power, a third lens group having positive refractive power, and a fourth lens group; upon zooming from a wide angle end state to a telephoto end state, the first lens group, the second lens group, the third lens group and the fourth lens group being moved along the optical axis, respectively. With this configuration, it is possible to realize an optical system capable of zooming and realize a high optical performance by suppressing a variation in curvature of field associated with the zooming.

Further, based on such configuration, in the variable magnification optical system according to the third embodiment of the present invention, the first lens group comprises one negative lens and one positive lens. By such configuration, it is possible to satisfactorily correct lateral chromatic aberration, lessening a total length of an optical system. In addition, when one more positive lens is added, it is possible to correct a coma aberration and curvature of field more satisfactorily. However, a total length of the optical system increases and thus it is difficult to realize downsizing.

Further, based on such configuration, in the variable magnification optical system according to the third embodiment of the present application, the third lens group comprises, in order from the object side along the optical axis, a 3a-th lens group having positive refractive power, an aperture, and a 3b-th lens group having positive refractive power. With this configuration, it is possible to satisfactorily correct a coma aberration.

Further, based on such configuration, the variable magnification optical system according to the third embodiment of the present application can realize downsizing and enhancement of the performance by satisfying the following conditional expression (5):

$$|f3a/f4|<0.540 \tag{5}$$

where f3a denotes a focal length of the 3a-th lens group, and f4 denotes a focal length of the fourth lens group.

The conditional expression (5) defines the focal lengths of the 3a-th lens group and the fourth lens group. With satisfying the conditional expression (5), it is possible to realize satisfactory correction of aberration and downsizing.

When the value of |f3a/f4| is equal to or exceeds the higher limit value of the conditional expression (5), the focal length of the fourth lens group becomes short and thus it is difficult to correct a coma aberration and curvature of field. Meanwhile, in order to attain the advantageous effect of the present application surely, it is preferable to set the higher limit value of the conditional expression (5) to 0.520.

Further, in order to attain the advantageous effect of the present application surely, it is preferable that the conditional expression (5) further satisfies the condition, 0.100<|f3a/f4|. When the value of |f3a/f4| is equal to or falls below the lower limit value of the conditional expression (5), the focal length of the 3a-th lens group becomes short and thus it is difficult to correct a spherical aberration. When it is intended to correct a spherical aberration satisfactorily, the increase of the number of lenses is required. In that case, downsizing as an object of the present invention cannot be realized. Meanwhile, in order to attain the advantageous effect of the present application more surely, it is preferable to set the lower limit value of the conditional expression (5) to 0.200.

Further, in the variable magnification optical system according to the third embodiment of the present invention, it is preferable that a distance between the 3a-th lens group and the 3b-th lens group increases upon zooming from the wide angle end state to the telephoto end state. By such configuration, it is possible to satisfactorily correct a variation in spherical aberration associated with zooming.

Further, in the variable magnification optical system according to the third embodiment of the present invention, it is preferable that the following conditional expression (6) is satisfied:

$$0.100<f3a/f3b<0.700 \tag{6}$$

where f3a denotes a focal length of the 3a-th lens group, and f3b denotes a focal length of the 3b-th lens group.

The conditional expression (6) defines the focal lengths of the 3a-th lens group and the 3b-th lens group. With satisfying the conditional expression (6), it is possible to realize a small-sized optical system, maintaining an excellent optical performance upon zooming.

When the value of f3a/f3b is equal to or exceeds the higher limit value of the conditional expression (6), the focal length of the 3b-th lens group becomes short and thus it is impossible to satisfactorily correct curvature of field and a coma aberration. Meanwhile, in order to attain the advantageous effect of the present application surely, it is preferable to set the higher limit value of the conditional expression (6) to 0.680.

When the value of f3a/f3b is equal to or falls below the lower limit value of the conditional expression (6), the focal length of the 3a-th lens group becomes short and thus it is impossible to correct a spherical aberration satisfactorily. Meanwhile, in order to attain the advantageous effect of the present application surely, it is preferable to set the lower limit value of the conditional expression (6) to 0.200.

Further, in the variable magnification optical system according to the third embodiment of the present invention, it is preferable that the following conditional expression (7) is satisfied:

$$|f3b/f4|<1.00 \tag{7}$$

where f3b denotes a focal length of the 3b-th lens group, and f4 denotes a focal length of the fourth lens group.

The conditional expression (7) defines the focal lengths of the 3b-th lens group and the fourth lens group. With satisfying the conditional expression (7), it is possible to realize a small-sized optical system, maintaining an excellent optical performance upon zooming.

When the value of |f3b/f4| is equal to or exceeds the higher limit value of the conditional expression (7), the focal length of the fourth lens group becomes short and thus it is impossible to satisfactorily correct curvature of field and a coma aberration. Meanwhile, in order to attain the advantageous effect of the present application surely, it is preferable to set the higher limit value of the conditional expression (7) to 0.900.

Further, in order to attain the advantageous effect of the present application surely, it is preferable that the conditional expression (7) further satisfies the condition, $0.100<|f3b/f4|$. When the value of |f3b/f4| is equal to or falls below the lower limit value of the conditional expression (7), the focal length of the 3b-th lens group becomes short and thus it is impossible to satisfactorily correct curvature of field and a coma aberration. Meanwhile, in order to attain the advantageous effect of the present application more surely, it is preferable to set the lower limit value of the conditional expression (7) to 0.300.

Further, in the variable magnification optical system according to the third embodiment of the present invention, it is preferable that the 3b-th lens group comprises at least one negative lens component and the following conditional expression (8) is satisfied:

$$0.700<(-f3bn)/f3a<1.500 \tag{8}$$

where f3bn denotes a focal length of the negative lens component on the most image side within the 3b-th lens group, and f3a denotes a focal length of the 3a-th lens group.

In addition, the lens component denotes a single lens or a cemented lens.

The conditional expression (8) defines the focal lengths of the 3a-th lens group and the negative lens component on the most image side within the 3b-th lens group. With satisfying the conditional expression (8), it is possible to realize a small-sized optical system, maintaining an excellent optical performance upon zooming.

When the value of (−f3bn)/f3a is equal to or exceeds the higher limit value of the conditional expression (8), the focal length of the 3a-th lens group becomes short and thus it is impossible to correct a spherical aberration satisfactorily. Meanwhile, in order to attain the advantageous effect of the present application surely, it is preferable to set the higher limit value of the conditional expression (8) to 1.400. In addition, in order to attain the advantageous effect of the present application more surely, it is preferable to set the higher limit value of the conditional expression (8) to 1.300.

When the value of (−f3bn)/f3a is equal to or falls below the lower limit value of the conditional expression (8), the focal length of the 3b-th lens group becomes short and thus it is impossible to satisfactorily correct curvature of field and a coma aberration. Meanwhile, in order to attain the advantageous effect of the present application surely, it is preferable to set the lower limit value of the conditional expression (8) to 0.740. In addition, in order to attain the advantageous effect of the present application more surely, it is preferable to set the lower limit value of the conditional expression (8) to 0.780.

Further, in the variable magnification optical system according to the third embodiment of the present invention, it is preferable that the second lens group comprises three lenses. In the case where the second lens group comprises two lenses, it is difficult to correct a coma aberration and lateral chromatic aberration upon zooming. In addition, in the case where the second lens group comprises four or more lenses, a thickness of the second lens group on the optical axis increases and thus a total length becomes long, so that it is difficult to realize downsizing.

Further, an imaging apparatus according to the third embodiment of the present invention is equipped with the variable magnification optical system configured as above-mentioned. With this configuration, it is possible to realize an imaging apparatus equipped with a high optical performance.

Further, a method for manufacturing a variable magnification optical system, according to the third embodiment of the present invention, is a method for manufacturing a variable magnification optical system comprising, in order from an object side along an optical axis, a first lens group having positive refractive power, a second lens group having negative refractive power, a third lens group having positive refractive power, and a fourth lens group; the method comprising: constructing, upon zooming from a wide angle end state to a telephoto end state, the first lens group, the second lens group, the third lens group and the fourth lens group to be moved along the optical axis, respectively; arranging the first lens group to comprise one negative lens and one positive lens; arranging the third lens group to comprise, in order from the object side along the optical axis, a 3a-th lens group having positive refractive power, an aperture, and a 3b-th lens group having positive refractive power; and constructing the condition of the following expression to be satisfied:

$$|f3a/f4|<0.540 \tag{5}$$

where f3a denotes a focal length of the 3a-th lens group, and f4 denotes a focal length of the fourth lens group.

With this method for manufacturing a variable magnification optical system, according to the third embodiment of the present invention, it is possible to manufacture a variable magnification optical system equipped with a high optical performance.

A variable magnification optical system, an imaging apparatus, and a method for manufacturing the variable magnification optical system, according to a fourth embodiment of the present invention are explained below.

At first, a variable magnification optical system according to the fourth embodiment of the present invention is explained. The variable magnification optical system according to the fourth embodiment of the present invention comprises, in order from an object side along an optical axis, a first lens group having positive refractive power, a second lens group having negative refractive power, a third lens group having positive refractive power, and a fourth lens group; upon zooming from a wide angle end state to a telephoto end state, the first lens group, the second lens group, the third lens group and the fourth lens group being moved along the optical axis, respectively. With this configuration, it is possible to realize an optical system capable of zooming and realize a high optical performance by suppressing a variation in curvature of field associated with the zooming.

Further, based on such configuration, in the variable magnification optical system according to the fourth embodiment of the present invention, the first lens group comprises one negative lens and one positive lens. By such configuration, it is possible to correct lateral chromatic aberration satisfactorily, lessening a total length of an optical system. In addition, when one more positive lens is added, it is possible to correct a coma aberration and curvature of field more satisfactorily. However, a total length of the optical system increases and thus it is difficult to realize downsizing.

Further, based on such configuration, in the variable magnification optical system according to the fourth embodiment of the present application, the third lens group comprises, in order from the object side along the optical axis, a 3a-th lens group having positive refractive power, an aperture, and a 3b-th lens group having positive refractive power. With this configuration, it is possible to correct a coma aberration satisfactorily.

Further, based on such configuration, the variable magnification optical system according to the fourth embodiment of the present application can realize downsizing and enhancement of the performance by satisfying the following conditional expression (9):

$$|f3a/f4|<1.00 \qquad (9)$$

where f3a denotes a focal length of the 3a-th lens group, and f4 denotes a focal length of the fourth lens group.

The conditional expression (9) defines the focal lengths of the 3a-th lens group and the fourth lens group. With satisfying the conditional expression (9), it is possible to realize satisfactory correction of aberration and downsizing.

When the value of |f3a/f4| is equal to or exceeds the higher limit value of the conditional expression (9), the focal length of the fourth lens group becomes short and thus it is difficult to correct a coma aberration and curvature of field. Meanwhile, in order to attain the advantageous effect of the present application surely, it is preferable to set the higher limit value of the conditional expression (9) to 0.800. In addition, in order to attain the advantageous effect of the present application more surely, it is preferable to set the higher limit value of the conditional expression (9) to 0.600.

Further, in order to attain the advantageous effect of the present application surely, it is preferable that the conditional expression (9) further satisfies the condition, $0.100<|f3a/f4|$. When the value of |f3a/f4| is equal to or falls below the lower limit value of the conditional expression (9), the focal length of the 3a-th lens group becomes short and thus it is difficult to correct a spherical aberration. When it is intended to correct a spherical aberration satisfactorily, the increase of the number of lenses is required. In that case, downsizing as an object of the present invention cannot be realized. Meanwhile, in order to attain the advantageous effect of the present application more surely, it is preferable to set the lower limit value of the conditional expression (9) to 0.200.

Further, based on such configuration, in the variable magnification optical system according to the fourth embodiment of the present invention, the 3b-th lens group comprises at least one negative lens component, and it is possible to realize downsizing and enhancement of the performance by satisfying the following conditional expression (8):

$$0.700<(-f3bn)/f3a<1.500 \qquad (8)$$

where f3bn denotes a focal length of the negative lens component on the most image side within the 3b-th lens group, and f3a denotes a focal length of the 3a-th lens group.

In addition, the lens component denotes a single lens or a cemented lens.

The conditional expression (8) defines the focal lengths of the 3a-th lens group and the negative lens component on the most image side within the 3b-th lens group. With satisfying the conditional expression (8), it is possible to realize a small-sized optical system, maintaining an excellent optical performance upon zooming.

When the value of (-f3bn)/f3a is equal to or exceeds the higher limit value of the conditional expression (8), the focal length of the 3a-th lens group becomes short and thus it is impossible to correct a spherical aberration satisfactorily. Meanwhile, in order to attain the advantageous effect of the present application surely, it is preferable to set the higher limit value of the conditional expression (8) to 1.400. In addition, in order to attain the advantageous effect of the present application more surely, it is preferable to set the higher limit value of the conditional expression (8) to 1.300.

When the value of (-f3bn)/f3a is equal to or falls below the lower limit value of the conditional expression (8), the focal length of the 3b-th lens group becomes short and thus it is impossible to satisfactorily correct curvature of field and a coma aberration. Meanwhile, in order to attain the advantageous effect of the present application surely, it is preferable to set the lower limit value of the conditional expression (8) to 0.750. In addition, in order to attain the advantageous effect of the present application more surely, it is preferable to set the lower limit value of the conditional expression (8) to 0.780.

Further, in the variable magnification optical system according to the fourth embodiment of the present invention, it is preferable that a distance between the 3a-th lens group and the 3b-th lens group increases upon zooming from the wide angle end state to the telephoto end state. By such configuration, it is possible to satisfactorily correct a variation in spherical aberration associated with zooming.

Further, in the variable magnification optical system according to the fourth embodiment of the present invention, it is preferable that the following conditional expression (6) is satisfied:

$$0.100<f3a/f3b<0.700 \qquad (6)$$

where f3a denotes a focal length of the 3a-th lens group, and f3b denotes a focal length of the 3b-th lens group.

The conditional expression (6) defines the focal lengths of the 3a-th lens group and the 3b-th lens group. With satisfying the conditional expression (6), it is possible to realize a small-sized optical system, maintaining an excellent optical performance upon zooming.

When the value of f3a/f3b is equal to or exceeds the higher limit value of the conditional expression (6), the focal length of the 3b-th lens group becomes short and thus it is impossible to satisfactorily correct curvature of field and a coma aberration. Meanwhile, in order to attain the advantageous effect of the present application surely, it is preferable to set the higher limit value of the conditional expression (6) to 0.620.

When the value of f3a/f3b is equal to or falls below the lower limit value of the conditional expression (6), the focal length of the 3a-th lens group becomes short and thus it is impossible to correct a spherical aberration satisfactorily. Meanwhile, in order to attain the advantageous effect of the present application surely, it is preferable to set the lower limit value of the conditional expression (6) to 0.200.

Further, in the variable magnification optical system according to the fourth embodiment of the present invention, it is preferable that the following conditional expression (7) is satisfied:

$$|f3b/f4|<1.00 \qquad (7)$$

where f3b denotes a focal length of the 3b-th lens group, and f4 denotes a focal length of the fourth lens group.

The conditional expression (7) defines the focal lengths of the 3b-th lens group and the fourth lens group. With satisfying the conditional expression (7), it is possible to realize a small-sized optical system, maintaining an excellent optical performance upon zooming.

When the value of |f3b/f4| is equal to or exceeds the higher limit value of the conditional expression (7), the focal length of the fourth lens group becomes short and thus it is impossible to satisfactorily correct curvature of field and a coma aberration. Meanwhile, in order to attain the advantageous effect of the present application surely, it is preferable to set the higher limit value of the conditional expression (7) to 0.900.

Further, in order to attain the advantageous effect of the present application surely, it is preferable that the conditional expression (7) further satisfies the condition, 0.100<|f3b/f4|. When the value of |f3b/f4| is equal to or falls below the lower limit value of the conditional expression (7), the focal length of the 3b-th lens group becomes short and thus it is impossible to satisfactorily correct curvature of field and a coma aberration. Meanwhile, in order to attain the advantageous effect of the present application more surely, it is preferable to set the lower limit value of the conditional expression (7) to 0.300.

Further, in the variable magnification optical system according to the fourth embodiment of the present invention, it is preferable that the second lens group comprises three lenses. In the case where the second lens group comprises two lenses, it is difficult to correct a coma aberration and lateral chromatic aberration upon zooming. In addition, in the case where the second lens group comprises four or more lenses, a thickness of the second lens group on the optical axis increases and thus a total length becomes long, so that it is difficult to realize downsizing.

Further, an imaging apparatus according to the fourth embodiment of the present invention is equipped with the variable magnification optical system configured as above-mentioned. With this configuration, it is possible to realize an imaging apparatus equipped with a high optical performance.

Further, a method for manufacturing a variable magnification optical system, according to the fourth embodiment of the present invention, is a method for manufacturing a variable magnification optical system comprising, in order from an object side along an optical axis, a first lens group having positive refractive power, a second lens group having negative refractive power, a third lens group having positive refractive power, and a fourth lens group; the method comprising: constructing, upon zooming from a wide angle end state to a telephoto end state, the first lens group, the second lens group, the third lens group and the fourth lens group to be moved along the optical axis, respectively; arranging the first lens group to comprise one negative lens and one positive lens; arranging the third lens group to comprise, in order from the object side along the optical axis, a 3a-th lens group having positive refractive power, an aperture, and a 3b-th lens group having positive refractive power; arranging the 3b-th lens group to include at least one negative lens component; and constructing the conditions of the following expressions to be satisfied:

$$|f3a/f4|<1.00 \qquad (9)$$

$$0.700<(-f3bn)/f3a<1.500 \qquad (8)$$

where f3a denotes a focal length of the 3a-th lens group, f4 denotes a focal length of the fourth lens group, and f3bn denotes a focal length of the negative lens component on the most image side within the 3b-th lens group.

With this method for manufacturing a variable magnification optical system, according to the fourth embodiment of the present invention, it is possible to manufacture a variable magnification optical system equipped with a high optical performance.

NUMERICAL EXAMPLES

Variable magnification optical systems relating to numerical examples according to the first to fourth embodiments of the present invention are explained with reference to the accompanying drawings. First to fourth Examples are examples in common according to the first to fourth embodiments.

First Example

FIG. 1 is a sectional view showing a lens configuration of a variable magnification optical system ZL1 relating to the first Example in common according to the first to fourth embodiments of the present invention.

As shown in FIG. 1, the variable magnification optical system ZL1 relating to the first Example is composed of, in order from an object side along an optical axis, a first lens group G1 having positive refractive power, a second lens group G2 having negative refractive power, a third lens group G3 having positive refractive power and a fourth lens group G4 having positive refractive power.

The first lens group G1 is composed of, in order from the object side along the optical axis, a cemented lens constructed by a negative meniscus lens L11 having a convex surface facing the object side cemented with a positive meniscus lens L12 having a convex surface facing the object side.

The second lens group G2 is composed of, in order from the object side along the optical axis, a negative meniscus lens L21 having a convex surface facing the object side, a double concave lens L22, a positive meniscus lens L23 having a convex surface facing the object side, and the negative meniscus lens L21 positioned on the most object side within the second lens group G2 is an aspherical lens of which a lens surface on the object side is formed into an aspherical shape.

The third lens group G3 is composed of, in order from the object side on the optical axis, a 3a-th lens group G3a having positive refractive power, an aperture stop SP, and a 3b-th lens group G3b having positive refractive power.

The 3a-th lens group G3a is composed of a double convex lens L31.

The 3b-th lens group G3b is composed of, in order from the object side along the optical axis, a cemented lens constructed by a double convex lens L32 cemented with a double concave lens L33, and a cemented lens constructed by a positive meniscus lens L34 having a concave surface facing the object side cemented with a double concave lens L35.

The fourth lens group G4 is composed of, in order from the object side along the optical axis, a double convex lens L41 and a negative meniscus lens L42 having a concave surface facing the object side, and the negative meniscus lens L42 positioned on the most image side within the fourth lens group G4 is an aspherical lens of which a lens surface on the image side is formed into an aspherical shape.

In the neighborhood of an image plane I, a low-pass filter FL is disposed.

An imaging device (not shown in the figure) constructed by CCD, CMOS or the like is disposed on the image plane I.

In the variable magnification optical system ZL1 relating to the present Example, upon zooming from the wide angle end state to the telephoto end state, the first lens group G1 is moved toward the object side, the second lens group G2 is temporarily moved toward a side of the image plane I and then moved toward the object side, the 3a-th lens group G3a and the fourth lens group G4 are integrally moved toward the object side, and the 3b-th lens group G3b is moved toward the object side, with respect to the image plane I, such that a distance between the first lens group G1 and the second lens group G2 is increased, a distance between the second lens group G2 and the 3a-th lens group G3a is decreased, a distance between the 3a-th lens group G3a and the 3b-th lens group G3b is increased, and a distance between the 3b-th lens group G3b and the fourth lens group G4 is decreased.

The aperture stop SP is disposed between the 3a-th lens group G3a and the 3b-th lens group G3b, and moved together with the 3a-th lens group G3a upon zooming from the wide angle end state to the telephoto end state.

Further, in the variable magnification optical system ZL1 relating to the present Example, a cemented lens having negative refractive power on the side of the image plane within the cemented lenses constituting the 3b-th lens group G3b is used as a vibration reduction lens group Gvr and moved so as to include a component in a direction orthogonal to the optical axis, whereby image plane correction upon the occurrence of image blurring, that is, vibration reduction, is performed.

Further, in the variable magnification optical system ZL1 relating to the present Example, a movement amount of the vibration reduction lens group Gvr is 0.387 (mm) in the wide angle end state, and it is 0.404 (mm) in the telephoto end state.

Table 1 below shows various values of the variable magnification optical system ZL1 relating to the first Example.

In [Entire Specifications] in Table 1, f denotes a focal length of the whole variable magnification optical system, FNO denotes an F-number, 2ω denotes an angle of view (unit "°"), Y denotes an image height, TL denotes a total length of the optical system, and an air conversion BF denotes an air-converted back focus. Now, the total length TL of the optical system is a distance on the optical axis from a lens surface on the most object side within the first lens group G1 to the image plane I. Further, the air conversion BF is a value obtained by measuring a distance on the optical axis from a lens surface on the most image side within the fourth lens group G4 to the image plane I, under the condition that optical blocks such as a filter having no refractive power are removed from an optical path. Further, W, M and T indicate focal length states denoted by a wide angle end state, an intermediate focal length state, and a telephoto end state, respectively.

In [Surface Data], m denotes an order of a lens surface counted from the object side, r denotes a radius of curvature of the lens surface, d denotes a lens surface-to-lens surface distance, nd denotes refractive index for d-line (wavelength λ=587.6 nm) and vd denotes an Abbe number for d-line (wavelength λ=587.6 nm). Further, OP denotes an object plane, and I denotes the image plane. Meanwhile, a radius of curvature r=∞ denotes a plane, and refractive index of air nd=1.000000 is omitted in the description. When a lens surface is aspherical, "*" is attached to the surface number and a value of a paraxial radius of curvature is indicated in the column of the radius of curvature r.

In [Aspherical Data], with respect to an aspherical surface shown in [Surface Data], a conical coefficient and an aspherical surface coefficient are shown in the case where the aspherical surface is exhibited by the following expression:

$$X(y) = (y^2/r) / \left[ 1 + [1 - \kappa(y^2/r^2)]^{1/2} \right] + A4y^4 + A6y^6 + A8y^8 + A10y^{10}$$

where y denotes a height in a direction vertical to the optical axis, X(y) denoted a displacement amount at the height y in a direction of the optical axis, r denotes a paraxial radius of curvature (a radius of curvature of a reference sphere), κ denotes a conical coefficient, and An denotes an n-th order aspherical coefficient. "E–n" denotes "×10$^{-n}$", for example, "1.234E–05" denotes "1.234×10$^{-5}$".

In [Lens Group Data], a starting surface number ST and a focal length f are shown for each lens group.

In [Variable Distance Data], a focal length f and a value of variable distance are shown.

In [Values for Conditional Expressions], values corresponding to respective conditional expressions are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced, the unit is not necessarily to be limited to "mm".

The above-mentioned reference symbols in Table 1 are also employed in the same manner in Tables of the after-mentioned Examples.

TABLE 1

First Example

[Entire Specifications]

|  | W | M | T |
|---|---|---|---|
| f | 28.5 | 49.2 | 78.9 |
| FNO | 3.6 | 5.0 | 5.6 |
| 2ω | 38.2 | 22.8 | 14.6 |
| Y | 21.6 | 21.6 | 21.6 |
| TL | 104.3 | 118.9 | 137.5 |
| AIR CONVERSION BF | 22.4 | 33.0 | 43.6 |

[Surface Data]

| m | r | d | nd | νd |
|---|---|---|---|---|
| OP | ∞ |  |  |  |
| 1) | 69.8451 | 1.70 | 1.84666 | 63.34 |
| 2) | 49.2913 | 6.13 | 1.6968 | 55.52 |
| 3) | 330.0000 | D3 |  |  |
| *4) | 79.1000 | 1.35 | 1.755 | 52.34 |
| 5) | 16.5989 | 7.79 |  |  |
| 6) | −50.9281 | 1.30 | 1.72916 | 54.61 |
| 7) | 109.8840 | 0.10 |  |  |
| 8) | 30.8619 | 3.36 | 1.84666 | 23.8 |
| 9) | 104.8439 | D9 |  |  |
| 10) | 123.7807 | 2.52 | 1.5186 | 69.89 |
| 11) | −38.2947 | D11 |  |  |
| 12) | ∞ | 0.50 | Aperture Stop S | |
| 13) | 16.5221 | 4.00 | 1.59319 | 67.9 |
| 14) | −32.3462 | 1.44 | 1.84666 | 23.8 |
| 15) | 221.1481 | 4.00 |  |  |
| 16) | −154.6423 | 2.69 | 1.64769 | 33.73 |
| 17) | −14.3173 | 1.26 | 1.60738 | 56.74 |
| 18) | 30.5152 | D18 |  |  |
| 19) | 32.4553 | 5.03 | 1.48749 | 70.31 |
| 20) | −26.6257 | 3.96 |  |  |
| 21) | −12.7834 | 1.50 | 1.7725 | 49.62 |
| *22) | −26.6557 | D22 |  |  |
| 23) | ∞ | 2.00 | 1.5168 | 63.88 |
| 24) | ∞ | 0.10 |  |  |
| I | ∞ |  |  |  |

[Lens Group Data]

|  | ST | f |
|---|---|---|
| G1 | 1 | 140.90 |
| G2 | 4 | −26.75 |
| G3a | 10 | 56.70 |
| G3b | 13 | 103.66 |
| G4 | 19 | 142.76 |
| Gvr | 16 | −46.70 |

[Aspherical Data]

m: 4

κ = 1
A4 = −2.27070E−06
A6 = −8.69500E−09
A8 = 2.51440E−11
A10 = −2.72400E−14 m: 22

κ = 1.0000
A4 = 1.45840E−05
A6 = 1.55010E−08
A8 = 3.09160E−11

[Variable Distance Data]

|  | W | M | T |
|---|---|---|---|
| f | 28.5 | 49.2 | 78.9 |
| D3 | 1.50 | 17.68 | 33.08 |
| D9 | 22.13 | 10.00 | 2.50 |
| D11 | 4.00 | 5.30 | 6.00 |
| D18 | 5.00 | 3.70 | 3.00 |
| D22 | 20.94 | 31.53 | 42.15 |

[Values for Conditional Expressions]

(1) |f3b/f4| = 0.73
(2) |fvr/f4| = 0.33
(3) f1/(−f2) = 5.27
(4) |f3a/f4| = 0.40
(5) |f3a/f4| = 0.397
(6) f3a/f3b = 0.547
(7) |f3b/f4| = 0.727
(8) (−f3bn)/f3a = 0.824
(9) |f3a/f4| = 0.397

Figure 2A:
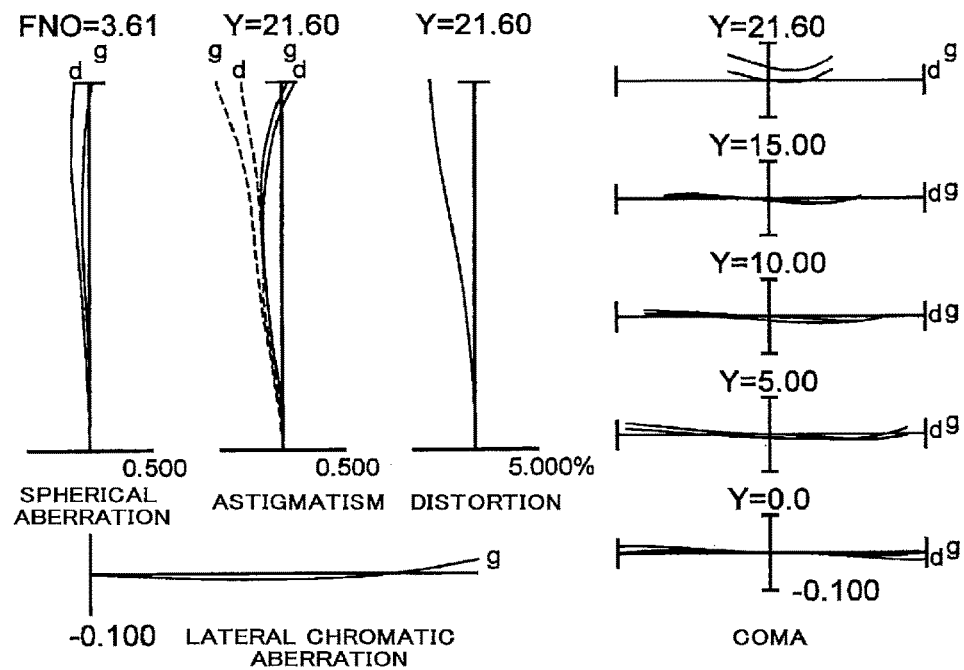
FIG. 2A shows diagrams of aberrations of the variable magnification optical system relating to the first Example in a wide angle end state upon focusing on infinity.
Figure 2B:
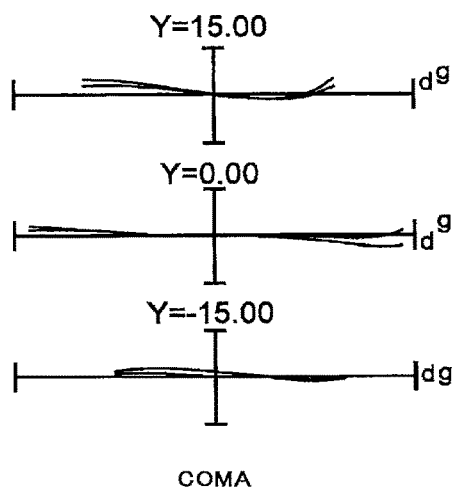
FIG. 2B shows a diagram of a meridional transverse aberration at the time when correction of image blurring is performed in the wide angle end state.

FIG. 2A shows diagrams of aberrations of the variable magnification optical system ZL1 relating to the first Example in a wide angle end state upon focusing on infinity, and FIG. 2B shows meridional transverse aberration at the time when correction of image blurring is performed in the wide angle end state.

Figure 3:
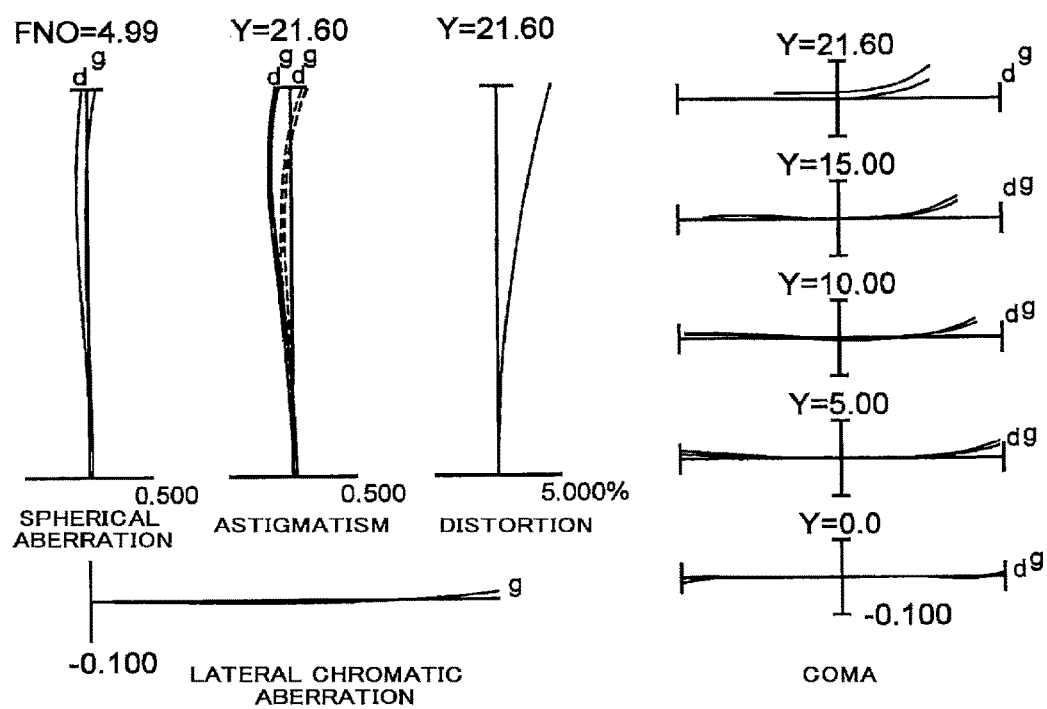
FIG. 3 shows diagrams of aberrations of the variable magnification optical system relating to the first Example in an intermediate focal length state upon focusing on infinity.

FIG. 3 shows diagrams of aberrations of the variable magnification optical system ZL1 relating to the first Example in an intermediate focal length state upon focusing on infinity.

Figure 4A:
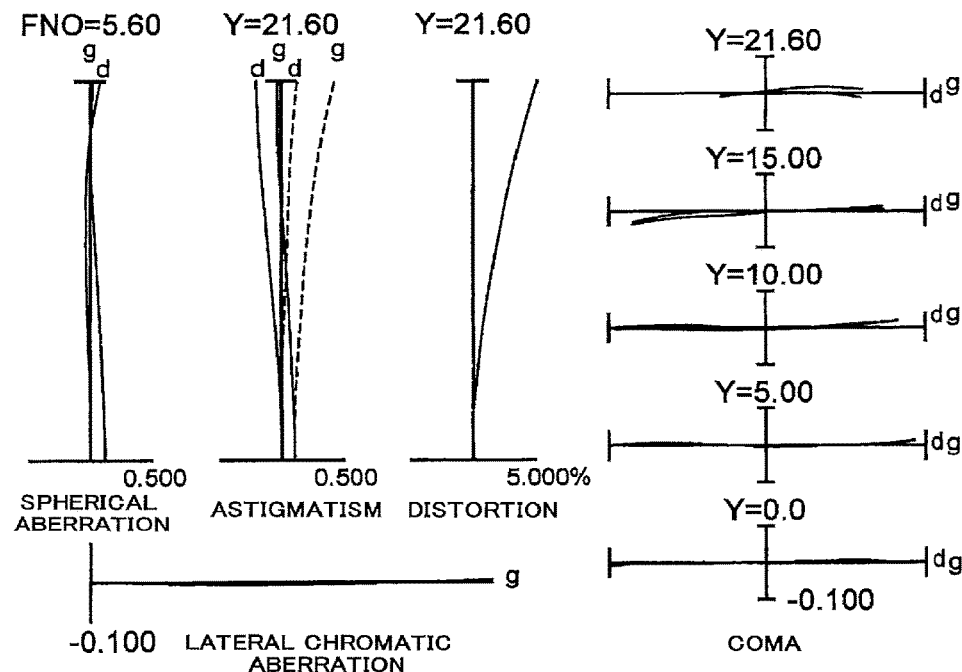
FIG. 4A shows diagrams of aberrations of the variable magnification optical system relating to the first Example in a telephoto end state upon focusing on infinity.
Figure 4B:
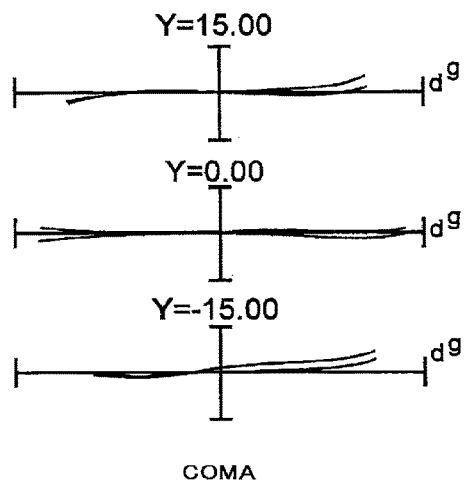
FIG. 4B shows a diagram of a meridional transverse aberration at the time when correction of the image blur is performed in the telephoto end state.

FIG. 4A shows diagrams of aberrations of the variable magnification optical system ZL1 relating to the first Example in a telephoto end state upon focusing on infinity, and FIG. 4B shows meridional transverse aberration at the time when the correction of the image blur is performed in the telephoto end state.

In respective graphs, FNO denotes an F-number and Y denotes an image height. In the graphs, d denotes an aberration curve at d-line (wavelength λ=587.6 nm), g denotes an aberration curve at g-line (wavelength λ=435.8 nm), and when neither d nor g is mentioned, a curve indicates an aberration at the d-line. In the graph showing a spherical aberration, a value of the F-number corresponding to the maximum aperture is indicated, and in the graphs showing astigmatism and distortion, the maximum values of the image height are indicated, respectively. In the graph showing astigmatism, a solid line indicates a sagittal image plane, and a broken line indicates a meridional image plane. In the graph showing a coma aberration, meridional coma aberrations corresponding to the d-line and the g-line are indicated. Incidentally, the above-mentioned symbols in the present Example are also employed in the same manner in the graphs of aberrations relating to the after-mentioned Examples.

As is apparent from the respective graphs of aberrations, in the variable magnification optical system ZL1 according to the first Example, various aberrations are corrected satisfactorily over the wide angle end state through the telephoto end state, providing a high optical performance.

Second Example

Figure 5:
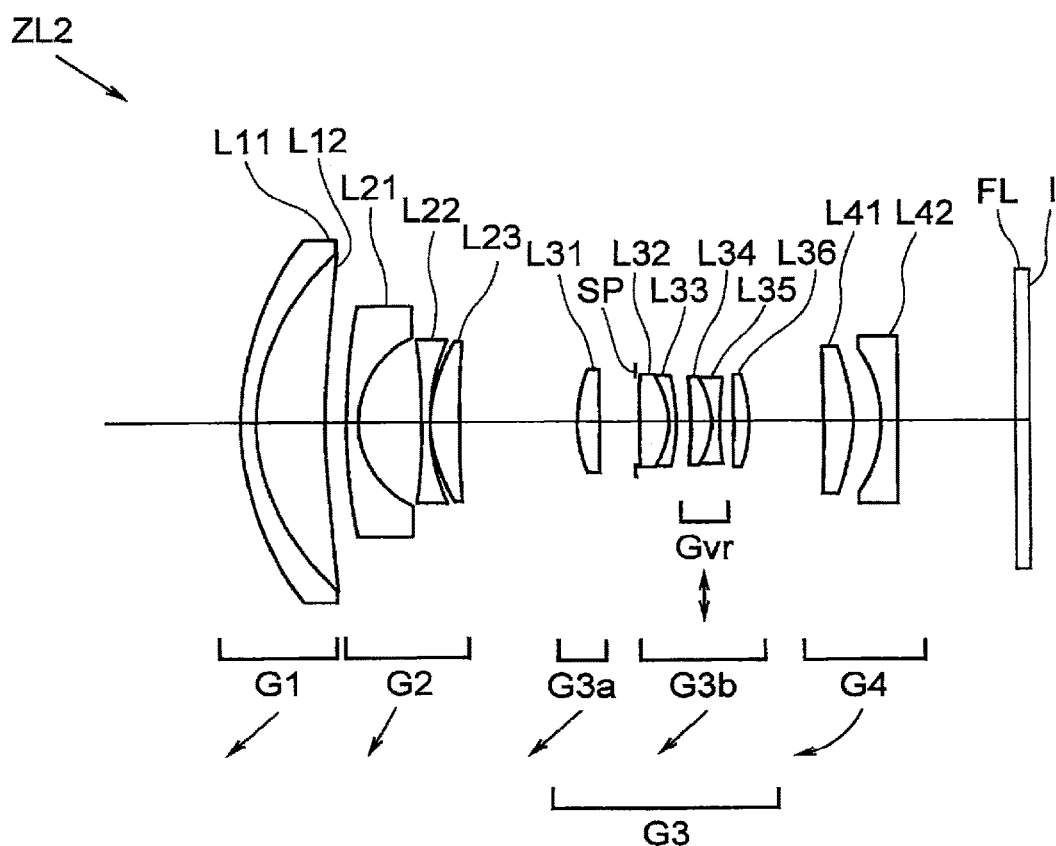
FIG. 5 is a view showing a configuration of a variable magnification optical system relating to a second Example in common according to the first to fourth embodiments of the present invention.

FIG. 5 is a sectional view showing a lens configuration of a variable magnification optical system ZL2 relating to the second Example in common according to the first to fourth embodiments of the present invention.

As shown in FIG. 5, the variable magnification optical system ZL2 relating to the second Example is composed of, in order from an object side along an optical axis, a first lens group G1 having positive refractive power, a second lens group G2 having negative refractive power, a third lens group G3 having positive refractive power and a fourth lens group G4 having negative refractive power.

The first lens group G1 is composed of, in order from the object side along the optical axis, a cemented lens constructed by a negative meniscus lens L11 having a convex surface facing the object side cemented with a positive meniscus lens L12 having a convex surface facing the object side.

The second lens group G2 is composed of, in order from the object side along the optical axis, a negative meniscus lens L21 having a convex surface facing the object side, a double concave lens L22, and a positive meniscus lens L23 having a convex surface facing the object side, and the negative meniscus lens L21 positioned on the most object side within the second lens group G2 is an aspherical lens of which a lens surface on the object side is formed into an aspherical shape.

The third lens group G3 is composed of, in order from the object side along the optical axis, a 3a-th lens group G3a having positive refractive power, an aperture stop SP, and a 3b-th lens group G3b having positive refractive power.

The 3a-th lens group G3a is composed of a double convex lens L31.

The 3b-th lens group G3b is composed of, in order from the object side along the optical axis, a cemented lens constructed by a double convex lens L32 cemented with a negative meniscus lens L33 having a concave surface facing the object side, a cemented lens constructed by a positive meniscus lens L34 having a concave surface facing the object side cemented with a double concave lens L35, and a positive meniscus lens L36 having a concave surface facing the object side, and the double convex lens L32 positioned on the most object side within the 3b-th lens group G3b is an aspherical lens of which a lens surface on the object side is formed into an aspherical shape.

The fourth lens group G4 is composed of, in order from the object side along the optical axis, a positive meniscus lens L41 having a concave surface facing the object side, and a negative meniscus lens L42 having a concave surface facing the object side, and the negative meniscus lens L41 positioned on the most object side within the fourth lens group G4 is an aspherical lens of which a lens surface on the image side is formed into an aspherical shape.

In the neighborhood of the image plane I, a low-pass filter FL is disposed.

An imaging device (not shown in the figure) constructed by CCD, CMOS or the like is disposed on the image plane I.

In the variable magnification optical system ZL2 relating to the present Example, upon zooming from the wide angle end state to the telephoto end state, the first lens group G1 is moved toward the object side, the second lens group G2 is moved into the object side, the 3a-th lens group G3a and the 3b-th lens group G3b are integrally moved toward the object side, and the fourth lens group G4 is moved toward the object side, with respect to the image plane I, such that a distance between the first lens group G1 and the second lens group G2 is increased, a distance between the second lens group G2 and the 3a-th lens group G3a is decreased, and a distance between the 3b-th lens group G3b and the fourth lens group G4 is decreased.

The aperture stop SP is disposed between the 3a-th lens group G3a and the 3b-th lens group G3b, and moved together with the 3a-th lens group G3a and the 3b-th lens group G3b upon zooming from the wide angle end state to the telephoto end state.

Further, in the variable magnification optical system ZL2 relating to the present Example, a cemented lens having negative refractive power on the side of the image plane within the cemented lenses constituting the 3b-th lens group G3b is used as a vibration reduction lens group Gvr and moved so as to include a component in a direction orthogonal to the optical axis, whereby image plane correction upon the occurrence of image blurring, that is, vibration reduction, is performed.

Further, in the variable magnification optical system ZL2 relating to the present Example, a movement amount of the vibration reduction lens group Gvr is 0.330 (mm) in the wide angle end state, and it is 0.364 (mm) in the telephoto end state.

Table 2 below shows various values of the variable magnification optical system ZL2 relating to the second Example.

TABLE 2

Second Example

[Entire Specifications]

|  | W | M | T |
|---|---|---|---|
| f | 28.1 | 39.1 | 81.2 |
| FNO | 3.6 | 4.6 | 6.0 |
| 2ω | 78.6 | 58.6 | 29.0 |
| Y | 21.6 | 21.6 | 21.6 |
| TL | 106.9 | 111.6 | 143.7 |
| AIR CONVERSION BF | 17.8 | 31.2 | 43.5 |

[Surface Data]

| m | r | d | nd | νd |
|---|---|---|---|---|
| OP | ∞ | | | |
| 1) | 49.8244 | 2.00 | 1.80518 | 25.45 |
| 2) | 35.6484 | 9.11 | 1.63854 | 55.34 |
| 3) | 181.0912 | D3 | | |
| *4) | 95.5564 | 1.50 | 1.80400 | 46.60 |
| 5) | 14.4419 | 8.80 | | |
| 6) | −104.0414 | 1.00 | 1.69680 | 55.52 |
| 7) | 31.0596 | 0.10 | | |
| 8) | 22.6472 | 4.00 | 1.75520 | 27.57 |
| 9) | 210.8334 | D9 | | |
| 10) | 23.4456 | 3.00 | 1.61800 | 63.34 |
| 11) | −658.7055 | 4.96 | | |
| 12) | ∞ | 0.50 | Aperture Stop S | |
| *13) | 145.1295 | 4.00 | 1.61881 | 63.85 |
| 14) | −13.9631 | 1.00 | 1.75520 | 27.57 |
| 15) | −29.2259 | 2.00 | | |
| 16) | −65.0000 | 2.80 | 1.75520 | 27.57 |
| 17) | −13.1839 | 1.00 | 1.67270 | 32.19 |
| 18) | 39.0356 | 2.00 | | |
| 19) | −298.7544 | 2.00 | 1.51823 | 58.82 |
| 20) | −27.2336 | D20 | | |
| 21) | −250.0000 | 4.00 | 1.58913 | 61.22 |
| *22) | −31.3591 | 3.70 | | |
| 23) | −21.5784 | 2.20 | 1.58913 | 61.22 |
| 24) | −1521.8520 | D24 | | |
| 25) | ∞ | 2.00 | 1.5168 | 63.88 |
| 26) | ∞ | 0.10 | | |
| I | ∞ | | | |

[Lens Group Data]

|  | ST | f |
|---|---|---|
| G1 | 1 | 120.00 |
| G2 | 4 | −21.83 |
| G3a | 10 | 36.70 |
| G3b | 13 | 65.77 |
| G4 | 21 | −112.60 |
| Gvr | 16 | −43.76 |

TABLE 2-continued

Second Example

[Aspherical Data]

m: 4

κ = 1
A4 = −7.19631E−07
A6 = −7.19631E−09
A8 = −3.84239E−11
A10 = −5.62787E−14
m: 13

κ = 1.0000
A4 = −3.82892E−05
A6 = 2.39543E−08
A8 = −4.31977E−09
A10 = 5.50769E−11
m: 22

κ = 1.0000
A4 = 1.98292E−06
A6 = −5.99060E−08
A8 = 5.18983E−10
A10 = −1.30187E−12

[Variable Distance Data]

|  | W | M | T |
|---|---|---|---|
| f | 28.1 | 39.1 | 81.2 |
| D3 | 3.00 | 5.28 | 34.73 |
| D9 | 15.82 | 9.46 | 1.20 |
| D20 | 10.03 | 5.30 | 3.92 |
| D24 | 16.37 | 29.76 | 42.12 |

[Values for Conditional Expressions]

(1) |f3b/f4| = 0.58
(2) fvr/f4 = 0.39
(3) f1/(−f2) = 5.50
(4) |f3a/f4| = 0.33
(5) |f3a/f4| = 0.326
(6) f3a/f3b = 0.558
(7) |f3b/f4| = 0.584
(8) (−f3bn)/f3a = 1.193
(9) |f3a/f4| = 0.326

Figure 6A:
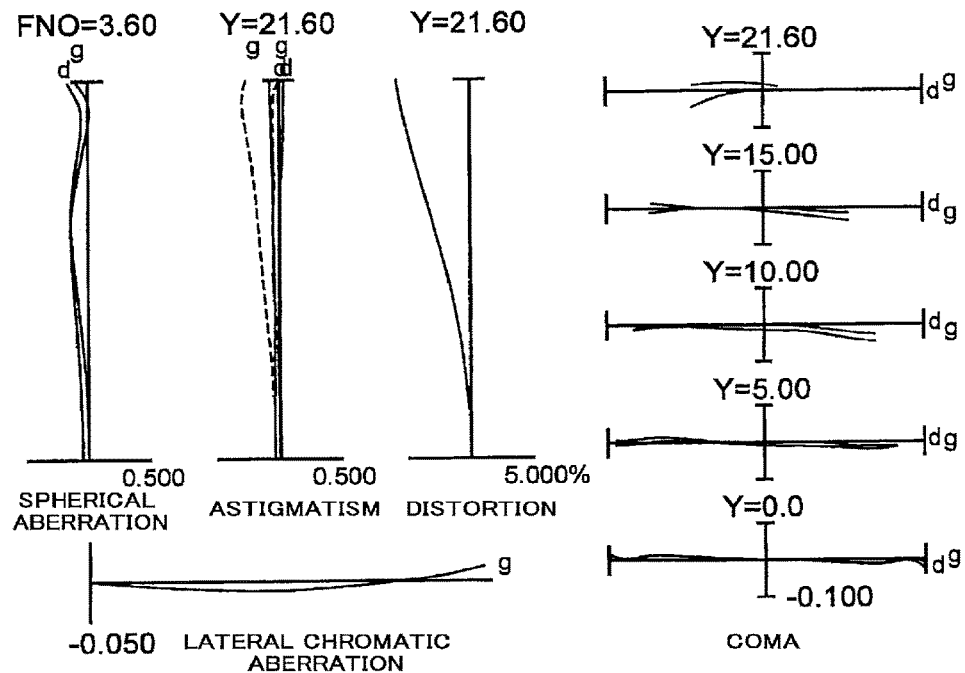
FIG. 6A shows diagrams of aberrations of the variable magnification optical system relating to the second Example in a wide angle end state upon focusing on infinity.
Figure 6B:
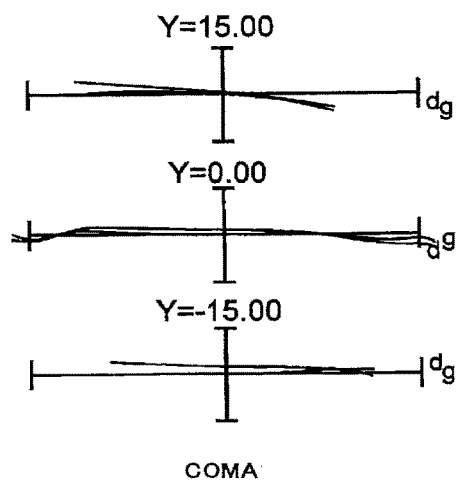
FIG. 6B shows a diagram of a meridional transverse aberration at the time when correction of image blurring is performed in the wide angle end state.

FIG. 6A shows diagrams of aberrations of the variable magnification optical system ZL2 relating to the second Example in a wide angle end state upon focusing on infinity, and FIG. 6B shows meridional transverse aberration at the time when correction of image blurring is performed in the wide angle end state.

Figure 7:
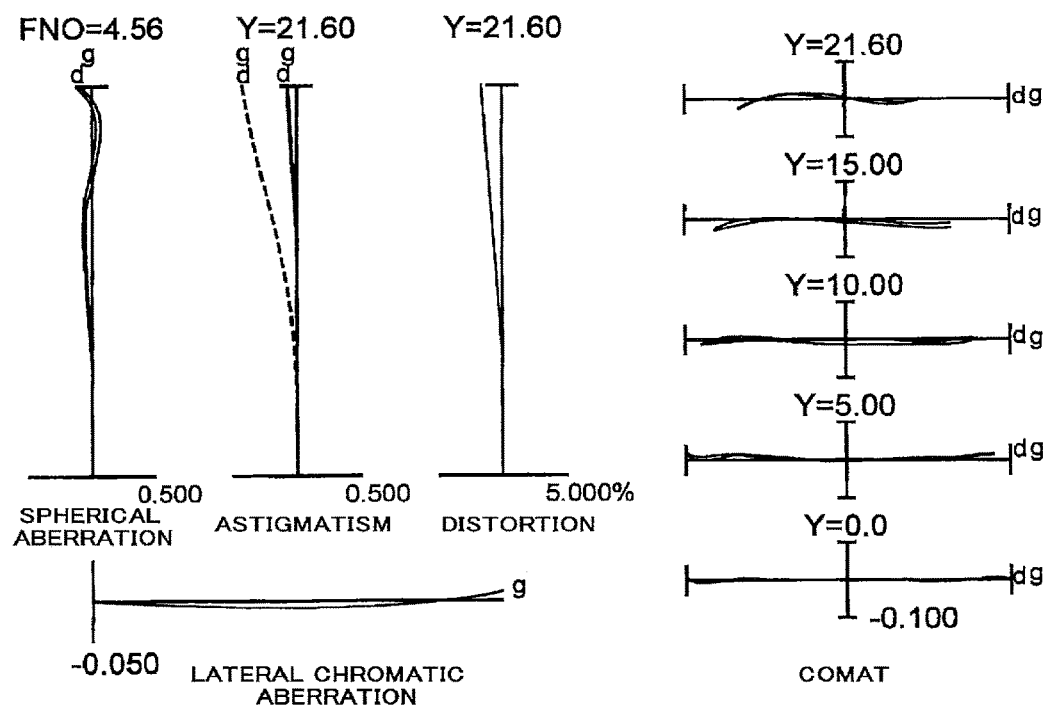
FIG. 7 shows diagrams of aberrations of the variable magnification optical system relating to the second Example in an intermediate focal length state upon focusing on infinity.

FIG. 7 shows diagrams of aberrations of the variable magnification optical system ZL2 relating to the second Example in an intermediate focal length state upon focusing on infinity.

Figure 8A:
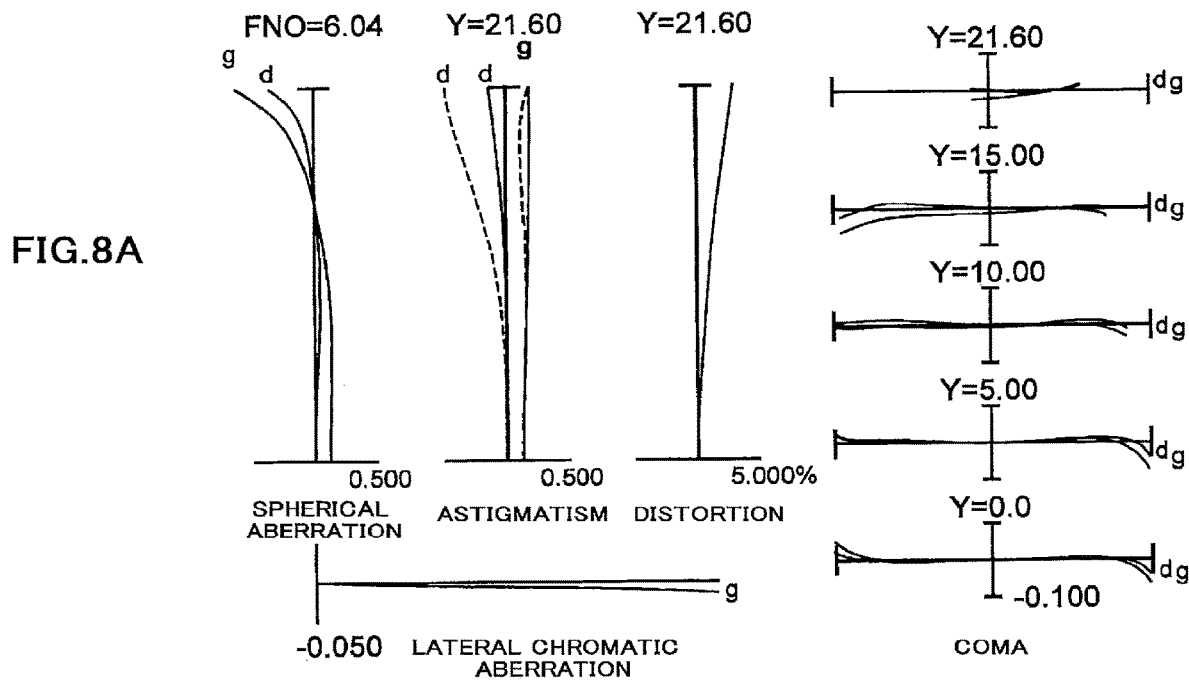
FIG. 8A shows diagrams of aberrations of the variable magnification optical system relating to the second Example in a telephoto end state upon focusing on infinity.
Figure 8B:
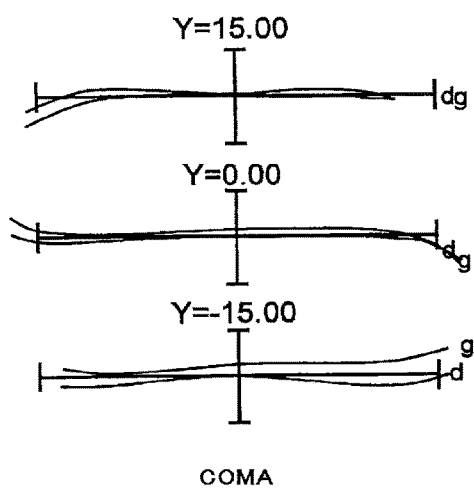
FIG. 8B shows a diagram of a meridional transverse aberration at the time when correction of the image blur is performed in the telephoto end state.

FIG. 8A shows diagrams of aberrations of the variable magnification optical system ZL2 relating to the second Example in a telephoto end state upon focusing on infinity, and FIG. 8B shows meridional transverse aberration at the time when the correction of the image blur is performed in the telephoto end state.

As is apparent from the respective graphs of aberrations, in the variable magnification optical system ZL2 according to the second Example, various aberrations are corrected satisfactorily over the wide angle end state through the telephoto end state, providing a high optical performance.

Third Example

Figure 9:
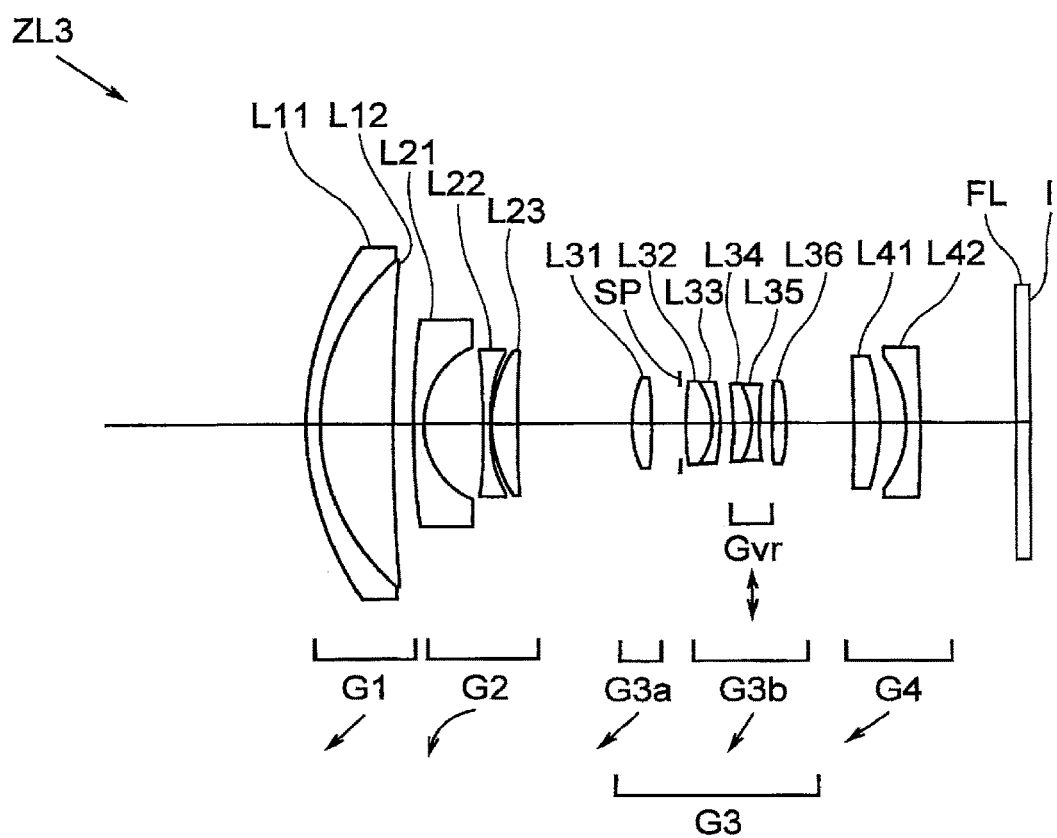
FIG. 9 is a view showing a configuration of a variable magnification optical system relating to a third Example in common according to the first to fourth embodiments of the present invention.

FIG. 9 is a sectional view showing a lens configuration of a variable magnification optical system ZL3 relating to the third Example in common according to the first to fourth embodiments of the present invention.

As shown in FIG. 9, the variable magnification optical system ZL3 relating to the third Example is composed of, in order from an object side along an optical axis, a first lens group G1 having positive refractive power, a second lens group G2 having negative refractive power, a third lens group G3 having positive refractive power and a fourth lens group G4 having negative refractive power.

The first lens group G1 is composed of, in order from the object side along the optical axis, a cemented lens constructed by a negative meniscus lens L11 having a convex surface facing the object side cemented with a positive meniscus lens L12 having a convex surface facing the object side.

The second lens group G2 is composed of, in order from the object side along the optical axis, a negative meniscus lens L21 having a convex surface facing the object side, a double concave lens L22, and a positive meniscus lens L23 having a convex surface facing the object side, and the negative meniscus lens L21 positioned on the most object side within the second lens group G2 is an aspherical lens of which a lens surface on the object side is formed into an aspherical shape.

The third lens group G3 is composed of, in order from the object side on the optical axis, a 3a-th lens group G3a having positive refractive power, an aperture stop SP, and a 3b-th lens group G3b having positive refractive power.

The 3a-th lens group G3a is composed of a double convex lens L31.

The 3b-th lens group G3b is composed of, in order from the object side along the optical axis, a cemented lens constructed by a double convex lens L32 cemented with a negative meniscus lens L33 having a concave surface facing the object side, a cemented lens constructed by a positive meniscus lens L34 having a concave surface facing the object side cemented with a double concave lens L35, and a double convex lens L36, and the double convex lens L32 positioned on the most object side within the 3b-th lens group G3b is an aspherical lens of which a lens surface on the object side is formed into an aspherical shape.

The fourth lens group G4 is composed of, in order from the object side along the optical axis, a positive meniscus lens L41 having a concave surface facing the object side, and a negative meniscus lens L42 having a concave surface facing the object side, and the negative meniscus lens L41 positioned on the most object side within the fourth lens group G4 is an aspherical lens of which a lens surface on the image side is formed into an aspherical shape.

In the neighborhood of the image plane I, a low-pass filter FL is disposed.

An imaging device (not shown in the figure) constructed by CCD, CMOS or the like is disposed on the image plane I.

In the variable magnification optical system ZL3 relating to the present Example, upon zooming from the wide angle end state to the telephoto end state, the first lens group G1 is moved toward the object side, the second lens group G2 is moved into the object side, the 3a-th lens group G3a is moved into the object side, the 3b-th lens group G3b is moved toward the object side, and the fourth lens group G4 is moved toward the object side, with respect to the image plane I, such that a distance between the first lens group G1 and the second lens group G2 is temporarily decreased and then increased, a distance between the second lens group G2 and the 3a-th lens group G3a is decreased, a distance between the 3a-th lens group G3a and the 3b-th lens group G3b is increased, and a distance between the 3b-th lens group G3b and the fourth lens group G4 is decreased.

The aperture stop SP is disposed between the 3a-th lens group G3a and the 3b-th lens group G3b, and moved together with the 3b-th lens group G3b upon zooming from the wide angle end state to the telephoto end state.

Further, in the variable magnification optical system ZL3 relating to the present Example, a cemented lens having negative refractive power on the side of the image plane within the cemented lenses constituting the 3b-th lens group G3b is used as a vibration reduction lens group Gvr and moved so as to include a component in a direction orthogonal to the optical axis, whereby image plane correction upon the occurrence of image blurring, that is, vibration reduction, is performed.

Further, in the variable magnification optical system ZL3 relating to the present Example, a movement amount of the vibration reduction lens group Gvr is 0.323 (mm) in the wide angle end state, and it is 0.367 (mm) in the telephoto end state.

Table 3 below shows various values of the variable magnification optical system ZL3 relating to the third Example.

TABLE 3

Third Example

[Entire Specifications]

| | W | M | T |
|---|---|---|---|
| F | 28.1 | 40.6 | 81.2 |
| FNO | 3.7 | 4.9 | 5.8 |
| 2ω | 78.0 | 56.3 | 28.1 |
| Y | 21.6 | 21.6 | 21.6 |
| TL | 107.9 | 107.3 | 142.1 |
| AIR CONVERSION BF | 16.1 | 27.2 | 33.4 |

[Surface Data]

| m | r | d | nd | νd |
|---|---|---|---|---|
| OP | ∞ | | | |
| 1) | 56.3898 | 2.00 | 1.80518 | 25.45 |
| 2) | 38.6820 | 11.00 | 1.63854 | 55.34 |
| 3) | 343.2075 | D3 | | |
| *4) | 129.4511 | 1.50 | 1.80400 | 46.60 |
| 5) | 14.8481 | 8.80 | | |
| 6) | −162.5392 | 1.00 | 1.69680 | 55.52 |
| 7) | 30.4039 | 0.10 | | |
| 8) | 23.1811 | 4.00 | 1.75520 | 27.57 |
| 9) | 232.6964 | D9 | | |
| 10) | 21.4215 | 3.00 | 1.48749 | 70.32 |
| 11) | −94.2244 | D11 | | |
| 12) | ∞ | 1.00 | Aperture Stop S | |
| *13) | 74.0303 | 4.00 | 1.61881 | 63.85 |
| 14) | −13.2841 | 1.00 | 1.67270 | 32.19 |
| 15) | −42.7602 | 2.00 | | |
| 16) | −60.0000 | 2.80 | 1.75520 | 27.57 |
| 17) | −15.8382 | 1.00 | 1.67270 | 32.19 |
| 18) | 42.0000 | 2.00 | | |
| 19) | 110.9609 | 2.00 | 1.54072 | 46.97 |
| 20) | −40.9338 | D20 | | |
| 21) | −250.0000 | 4.00 | 1.58913 | 61.22 |
| *22) | −36.0000 | 3.70 | | |
| 23) | −20.9907 | 2.20 | 1.63854 | 55.34 |
| 24) | −271.6504 | D24 | | |
| 25) | ∞ | 2.00 | 1.5168 | 63.88 |
| 26) | ∞ | 0.10 | | |
| I | ∞ | | | |

[Lens Group Data]

| | ST | f |
|---|---|---|

TABLE 3-continued

Third Example

| G1 | 1 | 120.00 |
|---|---|---|
| G2 | 4 | −22.48 |
| G3a | 10 | 36.11 |
| G3b | 13 | 68.07 |
| G4 | 21 | −79.25 |
| Gvr | 16 | −42.23 |

[Aspherical Data]

m: 4

κ = 1
A4 = −2.61235E−06
A6 = 3.87740E−09
A8 = −1.26453E−11
A10 = 2.36388E−14 m: 13

κ = 1.0000
A4 = −2.55225E−05
A6 = −2.85293E−08
A8 = −2.25512E−09
A10 = 2.62109E−11 m: 22

κ = 1.0000
A4 = 7.13545E−06
A6 = −3.87577E−08
A8 = 4.32982E−10
A10 = −1.32702E−12

[Variable Distance Data]

| | W | M | T |
|---|---|---|---|
| F | 28.1 | 40.6 | 81.2 |
| D3 | 3.00 | 0.10 | 35.55 |
| D9 | 16.88 | 8.08 | 1.20 |
| D11 | 4.24 | 4.86 | 5.09 |
| D20 | 9.96 | 9.34 | 9.11 |
| D24 | 14.66 | 25.76 | 31.97 |

[Values for Conditional Expressions]

(1) |f3b/f4| = 0.86
(2) |fvr/f4| = 0.53
(3) f1/(−f2) = 5.34
(4) |f3a/f4| = 0.46
(5) |f3a/f4| = 0.456
(6) f3a/f3b = 0.530
(7) |f3b/f4| = 0.859
(8) (−f3bn)/f3a = 1.169
(9) |f3a/f4| = 0.456

Figure 10A:
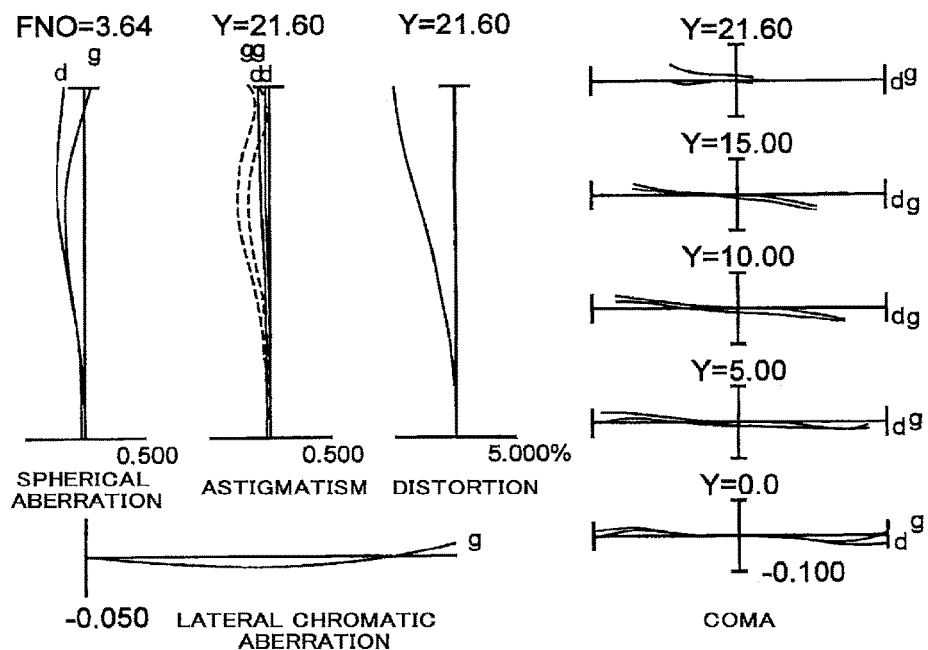
FIG. 10A shows diagrams of aberrations of the variable magnification optical system relating to the third Example in a wide angle end state upon focusing on infinity.
Figure 10B:
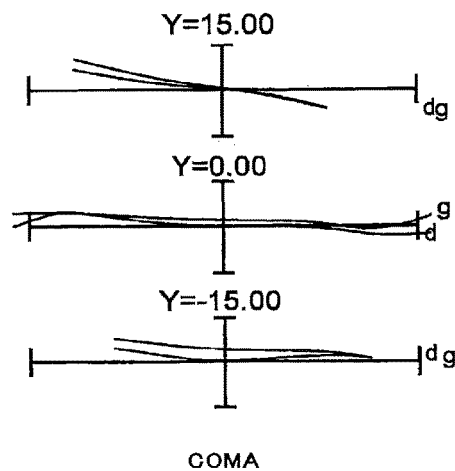
FIG. 10B shows a diagram of a meridional transverse aberration at the time when correction of image blurring is performed in the wide angle end state.

FIG. 10A shows diagrams of aberrations of the variable magnification optical system ZL3 relating to the third Example in a wide angle end state upon focusing on infinity, and FIG. 10B shows meridional transverse aberration at the time when correction of image blurring is performed in the wide angle end state.

Figure 11:
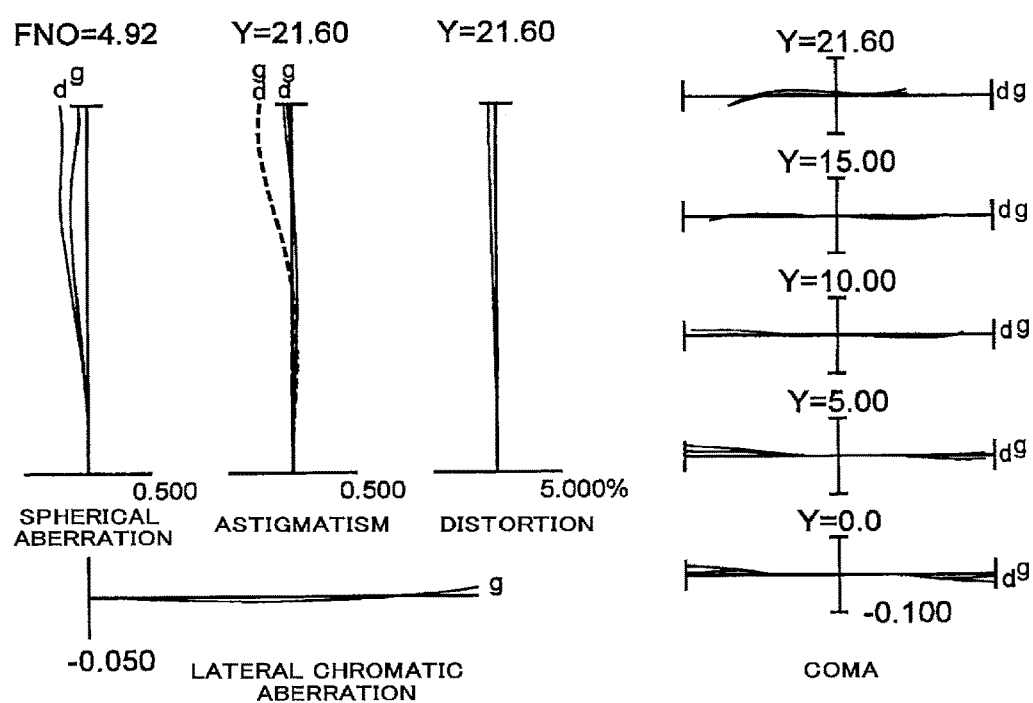
FIG. 11 shows diagrams of aberrations of the variable magnification optical system relating to the third Example in an intermediate focal length state upon focusing on infinity.

FIG. 11 shows diagrams of aberrations of the variable magnification optical system ZL3 relating to the third Example in an intermediate focal length state upon focusing on infinity.

Figure 12A:
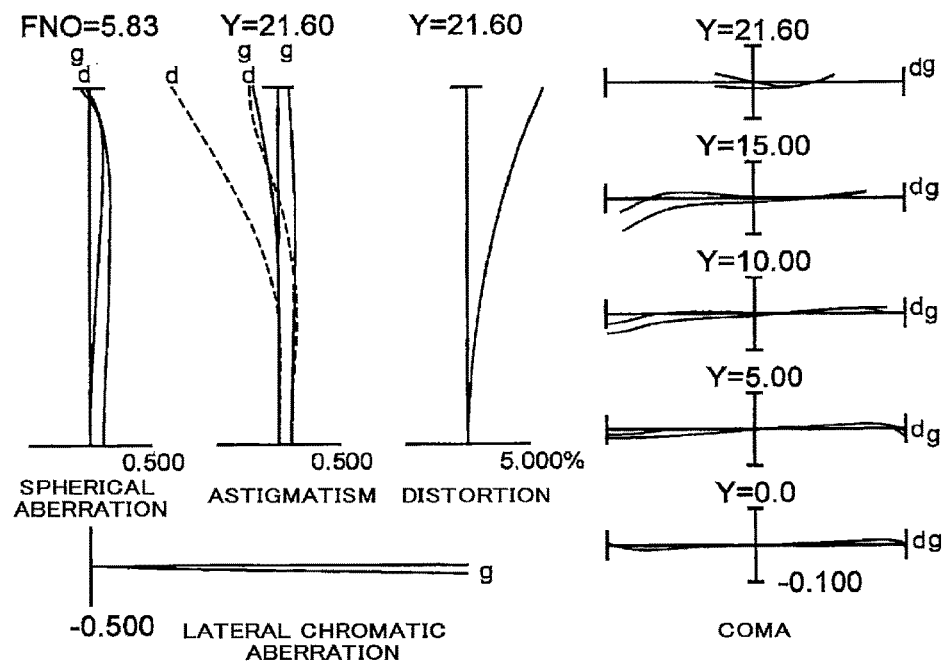
FIG. 12A shows diagrams of aberrations of the variable magnification optical system relating to the third Example in a telephoto end state upon focusing on infinity.
Figure 12B:
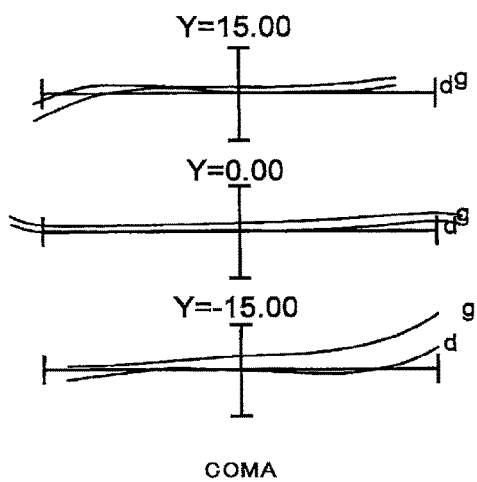
FIG. 12B shows a diagram of a meridional transverse aberration at the time when correction of image blurring is performed in the telephoto end state.

FIG. 12A shows diagrams of aberrations of the variable magnification optical system ZL3 relating to the third Example in a telephoto end state upon focusing on infinity, and FIG. 12B shows meridional transverse aberration at the time when the correction of the image blur is performed in the telephoto end state.

As is apparent from the respective graphs of aberrations, in the variable magnification optical system ZL3 according to the third Example, various aberrations are corrected satisfactorily over the wide angle end state through the telephoto end state, providing a high optical performance.

Fourth Example

Figure 13:
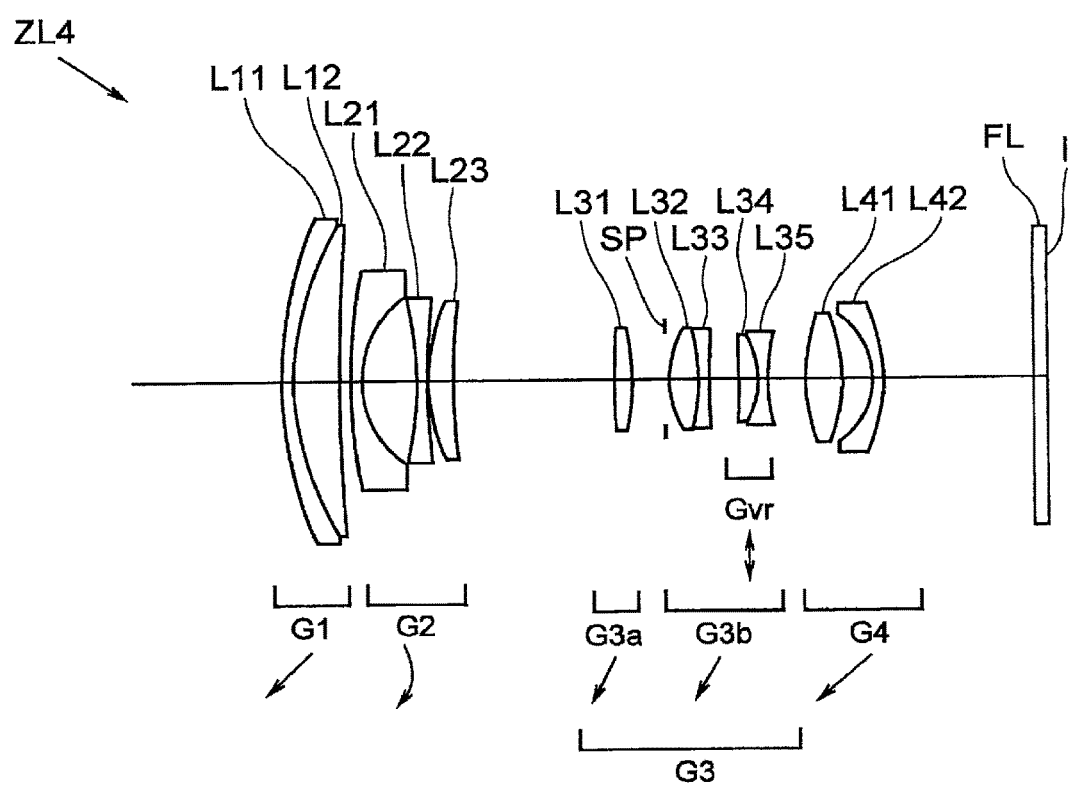
FIG. 13 is a view showing a configuration of a variable magnification optical system relating to a fourth Example in common according to the first to fourth embodiment of the present invention.

FIG. 13 is a sectional view showing a lens configuration of a variable magnification optical system ZL4 relating to the fourth Example in common according to the first to fourth embodiments of the present invention.

As shown in FIG. 13, the variable magnification optical system ZL4 relating to the fourth Example is composed of, in order from an object side along an optical axis, a first lens group G1 having positive refractive power, a second lens group G2 having negative refractive power, a third lens group G3 having positive refractive power, and a fourth lens group G4 having positive refractive power.

The first lens group G1 is composed of, in order from the object side along the optical axis, a cemented lens constructed by a negative meniscus lens L11 having a convex surface facing the object side cemented with a positive meniscus lens L12 having a convex surface facing the object side.

The second lens group G2 is composed of, in order from the object side along the optical axis, a negative meniscus lens L21 having a convex surface facing the object side, a double concave lens L22, and a positive meniscus lens L23 having a convex surface facing the object side, and the negative meniscus lens L21 positioned on the most object side within the second lens group G2 is an aspherical lens of which a lens surface on the object side is formed into an aspherical shape.

The third lens group G3 is composed of, in order from the object side on the optical axis, a 3a-th lens group G3a having positive refractive power, an aperture stop SP, and a 3b-th lens group G3b having positive refractive power.

The 3a-th lens group G3a is composed of a double convex lens L31.

The 3b-th lens group G3b is composed of, in order from the object side along the optical axis, a cemented lens constructed by a double convex lens L32 cemented with a double concave lens L33, a cemented lens constructed by a positive meniscus lens L34 having a concave surface facing the object side cemented with a double concave lens L35.

The fourth lens group G4 is composed of, in order from the object side along the optical axis, a double convex lens L41 and a negative meniscus lens L42 having a concave surface facing the object side, and the negative meniscus lens L42 positioned on the most image side within the fourth lens group G4 is an aspherical lens of which a lens surface on the image side is formed into an aspherical shape.

In the neighborhood of the image plane I, a low-pass filter FL is disposed.

An imaging device (not shown in the figure) constructed by CCD, CMOS or the like is disposed on the image plane I.

In the variable magnification optical system ZL4 relating to the present Example, upon zooming from the wide angle end state to the telephoto end state, the first lens group G1 is moved toward the object side, the second lens group G2 is temporarily moved toward a side of the image plane I and then moved into the object side, the 3a-th lens group G3a and the 3b-th lens group G3b are integrally moved toward the object side, and the fourth lens group G4 is moved toward the object side, with respect to the image plane I, such that a distance between the first lens group G1 and the second lens group G2 is increased, a distance between the second lens group G2 and the 3a-th lens group G3a is decreased, and a distance between the 3b-th lens group G3b and the fourth lens group G4 is decreased.

The aperture stop SP is disposed between the 3a-th lens group G3a and the 3b-th lens group G3b, and moved together with the 3b-th lens group G3b upon zooming from the wide angle end state to the telephoto end state.

Further, in the variable magnification optical system ZL4 relating to the present Example, a cemented lens having negative refractive power on the side of the image plane within the cemented lenses constituting the 3b-th lens group G3b is used as a vibration reduction lens group Gvr and moved so as to include a component in a direction orthogonal to the optical axis, whereby image plane correction upon the occurrence of image blurring, that is, vibration reduction, is performed.

Further, in the variable magnification optical system ZL4 relating to the present Example, a movement amount of the vibration reduction lens group Gvr is 0.387 (mm) in the wide angle end state, and it is 0.404 (mm) in the telephoto end state.

Table 4 below shows various values of the variable magnification optical system ZL4 relating to the fourth Example.

TABLE 4

Fourth Example

[Entire Specifications]

|  | W | M | T |
| --- | --- | --- | --- |
| F | 28.5 | 49.2 | 79.0 |
| FNO | 3.6 | 5.0 | 5.6 |
| 2ω | 38.2 | 22.8 | 14.6 |
| Y | 21.6 | 21.6 | 21.6 |
| TL | 104.8 | 118.1 | 136.0 |
| AIR CONVERSION BF | 22.3 | 33.0 | 43.6 |

[Surface Data]

| m | r | d | nd | vd |
| --- | --- | --- | --- | --- |
| OP | ∞ |  |  |  |
| 1) | 69.8451 | 1.70 | 1.84666 | 23.8 |
| 2) | 49.2913 | 6.13 | 1.6968 | 55.52 |
| 3) | 330.0000 | D3 |  |  |
| *4) | 79.1000 | 1.35 | 1.755 | 52.34 |
| 5) | 16.5989 | 7.79 |  |  |
| 6) | −50.9281 | 1.30 | 1.72916 | 54.61 |
| 7) | 109.8840 | 0.10 |  |  |
| 8) | 30.8619 | 3.36 | 1.84666 | 23.8 |
| 9) | 104.8439 | D9 |  |  |
| 10) | 123.7807 | 2.52 | 1.5186 | 69.89 |
| 11) | −38.2947 | 4.50 |  |  |
| 12) | ∞ | 0.50 | Aperture Stop S | |
| 13) | 16.5221 | 4.00 | 1.59319 | 67.9 |
| 14) | −32.3462 | 1.44 | 1.84666 | 23.8 |
| 15) | 221.1481 | 4.00 |  |  |
| 16) | −154.6423 | 2.69 | 1.64769 | 33.73 |
| 17) | −14.3173 | 1.26 | 1.60738 | 56.74 |
| 18) | 30.5152 | D18 |  |  |
| 19) | 32.4553 | 5.03 | 1.48749 | 70.31 |
| 20) | −26.6257 | 3.96 |  |  |
| 21) | −12.7834 | 1.50 | 1.7725 | 49.62 |
| *22) | −26.6557 | D22 |  |  |
| 23) | ∞ | 2.00 | 1.5168 | 63.88 |
| 24) | ∞ | 0.10 |  |  |
| I | ∞ |  |  |  |

[Lens Group Data]

|  | ST | f |
| --- | --- | --- |
| G1 | 1 | 14.090 |
| G2 | 4 | −26.75 |

TABLE 4-continued

Fourth Example

| | | |
|---|---|---|
| G3a | 10 | 56.70 |
| G3b | 13 | 103.66 |
| G4 | 19 | 142.76 |
| Gvr | 16 | −46.70 |

[Aspherical Data]

m: 4

$\kappa = 1$
A4 = −2.27070E−06
A6 = −8.69500E−09
A8 = 2.51440E−11
A10 = −2.72400E−14 m: 22

$\kappa = 1.0000$
A4 = 1.45840E−05
A6 = 1.55010E−08
A8 = 3.09160E−11

[Variable Distance Data]

| | W | M | T |
|---|---|---|---|
| f | 28.5 | 49.2 | 79.0 |
| D3 | 1.50 | 17.68 | 33.08 |
| D9 | 22.13 | 10.00 | 2.50 |
| D18 | 5.00 | 3.70 | 3.00 |
| D22 | 20.90 | 31.53 | 42.16 |

[Values for Conditional Expressions]

(1) |f3b/f4| = 0.73
(2) |fvr/f4| = 0.33
(3) f1/(−f2) = 5.27
(4) |f3a/f4| = 0.40
(5) |f3a/f4| = 0.397
(6) f3a/f3b = 0.547
(7) |f3b/f4| = 0.727
(8) (−f3bn)/f3a = 0.824
(9) |f3a/f4| = 0.397

Figure 14A:
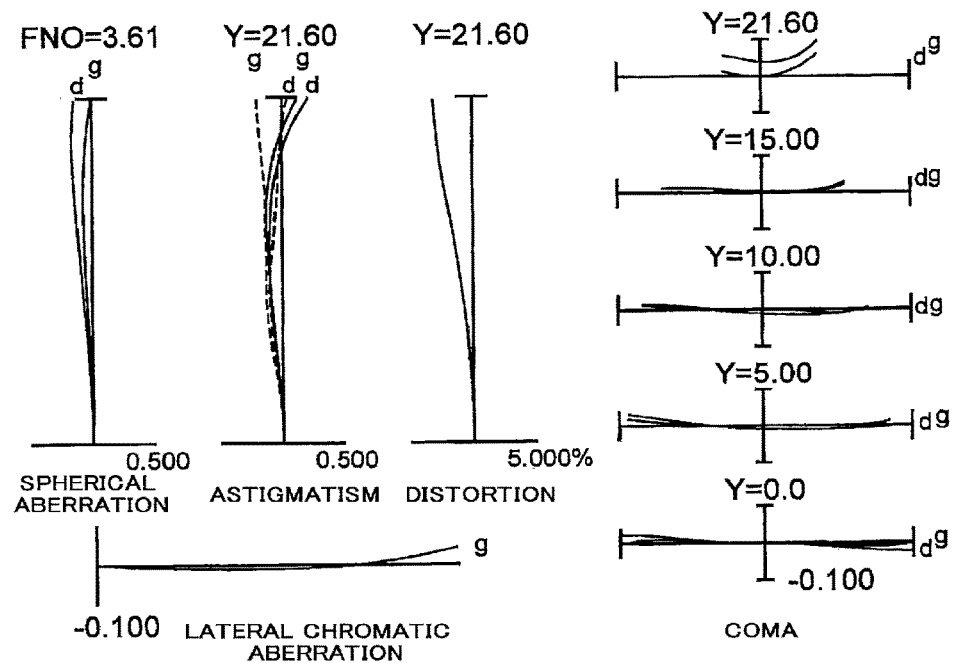
FIG. 14A shows diagrams of aberrations of the variable magnification optical system relating to the fourth Example in a wide angle end state upon focusing on infinity.
Figure 14B:
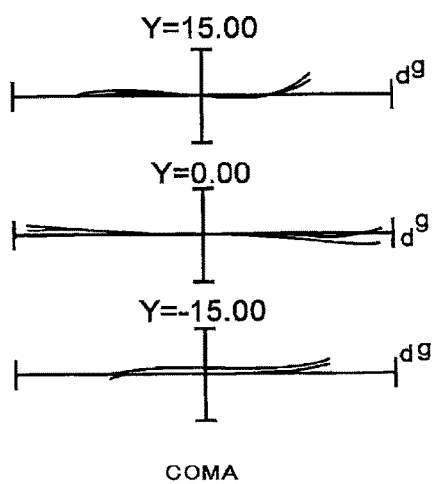
FIG. 14B shows a diagram of a meridional transverse aberration at the time when correction of image blurring is performed in the wide angle end state.

FIG. 14A shows diagrams of aberrations of the variable magnification optical system ZL4 relating to the fourth Example in a wide angle end state upon focusing on infinity, and FIG. 14B shows meridional transverse aberration at the time when correction of image blurring is performed in the wide angle end state.

Figure 15:
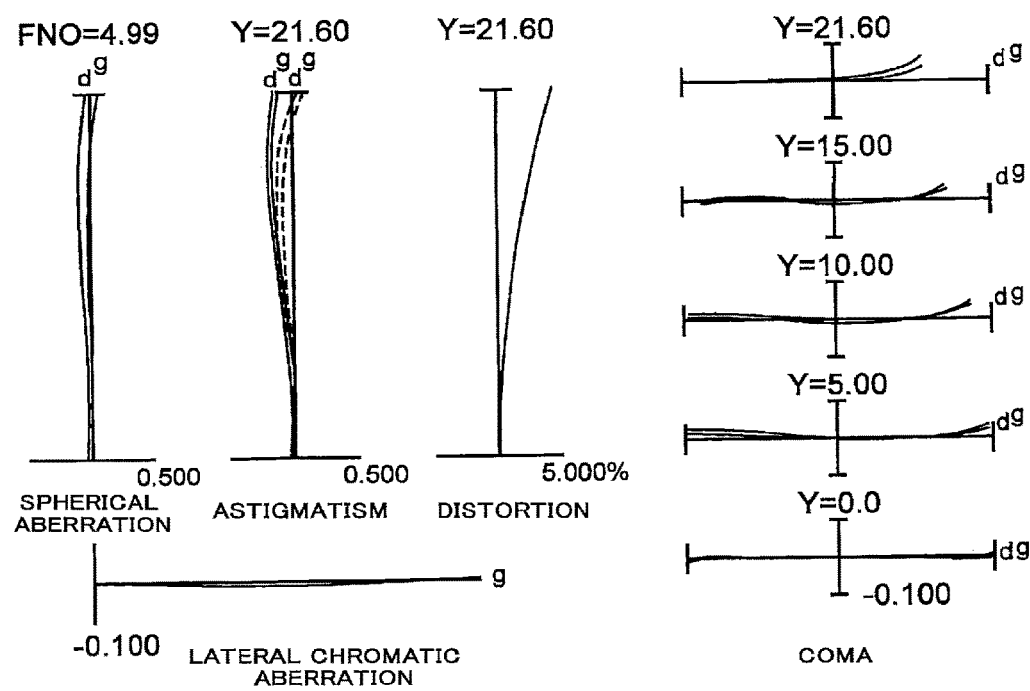
FIG. 15 shows diagrams of aberrations of the variable magnification optical system relating to the fourth Example in an intermediate focal length state upon focusing on infinity.

FIG. 15 shows diagrams of aberrations of the variable magnification optical system ZL4 relating to the fourth Example in an intermediate focal length state upon focusing on infinity.

Figure 16A:
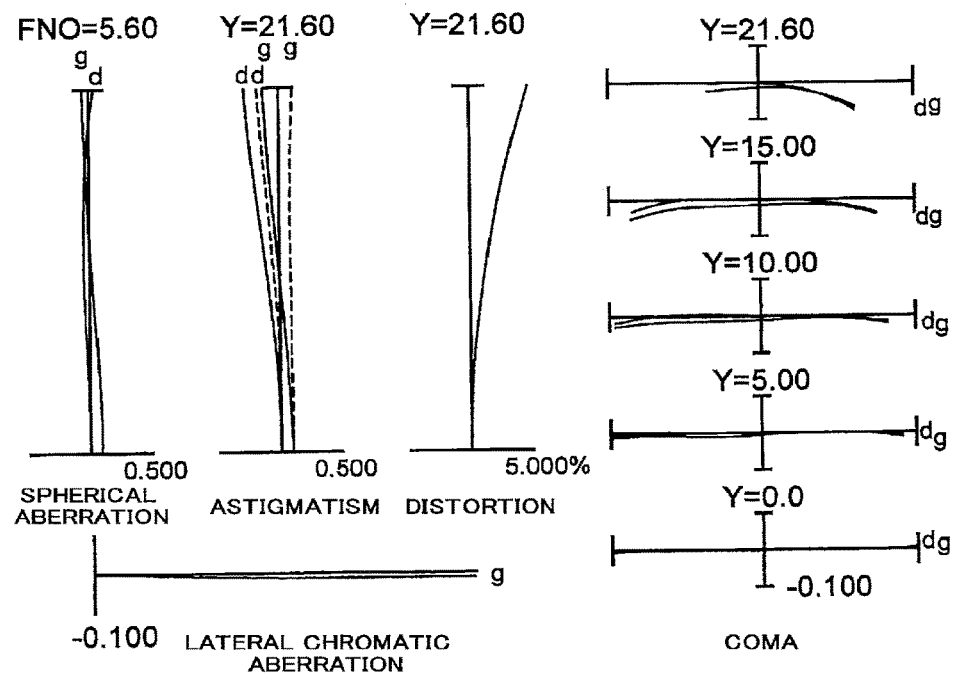
FIG. 16A shows diagrams of aberrations of the variable magnification optical system relating to the fourth Example in a telephoto end state upon focusing on infinity.
Figure 16B:
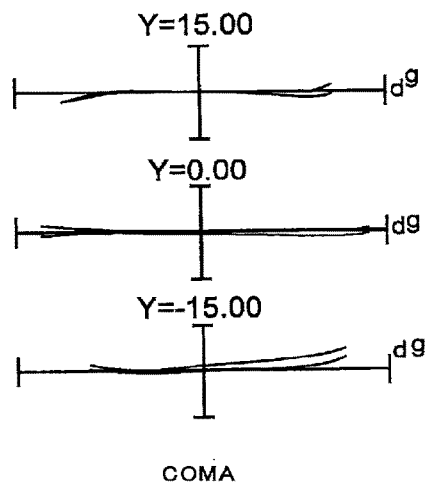
FIG. 16B shows meridional transverse aberration at the time when correction of image blurring is performed in the telephoto end state.

FIG. 16A shows diagrams of aberrations of the variable magnification optical system ZL4 relating to the fourth Example in a telephoto end state upon focusing on infinity, and FIG. 16B shows meridional transverse aberration at the time when the correction of the image blur is performed in the telephoto end state.

As is apparent from the respective graphs of aberrations, in the variable magnification optical system ZL4 according to the fourth Example, various aberrations are corrected satisfactorily over the wide angle end state through the telephoto end state, providing a high optical performance.

As described above, the above respective Examples can realize variable magnification optical systems equipped with a high optical performance.

The above respective examples show concrete examples of the present invention, but the present invention is not limited to them. The followings can be adopted properly within a range in which an optical performance is not deteriorated.

Although a four-lens-group configuration is shown for numerical Examples of the variable magnification optical systems according to the first to fourth embodiments of the present invention, the lens-group configuration according to the present application is not limited to them. The variable magnification optical system may be configured by other lens-group configurations (for example, a five-lens-group configuration). Concretely, there may be adopted a lens configuration that a lens or a lens group is added to the most object side of a variable magnification optical system relating to the first to fourth embodiments of the present invention and a lens configuration that a lens or a lens group is added to the most image side. Incidentally, a lens group means a portion that includes at least one lens separated by air spaces.

In the variable magnification optical systems according to the first to fourth embodiments of the present invention, in order to carry out focusing from infinity to a close object, a portion of a lens group, a single lens group in its entirety, or a plurality of lens groups may be moved along the optical axis as a focusing lens group. The focusing lens group can be used for auto focus, and is suitable for being driven by a motor for the auto focus such as an ultrasonic motor.

A lens surface used to compose the variable magnification optical systems according to the first to fourth embodiments of the present invention may be a spherical surface, a plane surface, or an aspherical surface. When the lens surface is a spherical surface or a plane surface, lens processing, assembling and adjustment become easy, and deterioration in optical performance caused by lens processing, assembling and adjustment errors can be prevented, so that it is preferable. Moreover, even if an image plane is deviated, deterioration in optical performance is little, so that it is preferable. When the lens surface is an aspherical surface, the aspherical surface may be fabricated by a grinding process, a glass molding process that a glass material is formed into an aspherical shape by a mold, or a compound type process that a resin material is formed into an aspherical shape on the glass lens surface. Further, the lens surface may be a diffractive optical surface, and the lens may be a graded-index type lens (GRIN lens) or a plastic lens.

It is preferable that the aperture stop SP of the variable magnification optical system relating to the first to fourth embodiments of the present invention is disposed in the neighborhood of the third lens group G3, but without providing a component as an aperture stop, a lens frame may replace therefor.

An anti-reflection coating having high transmittance over a broad wavelength range may be applied to a lens surface of a lens used to compose the variable magnification optical system relating to the first to fourth embodiments of the present invention, thereby, flare or ghost images are reduced so that an optical performance with high contrast can be attained.

Figure 17A:
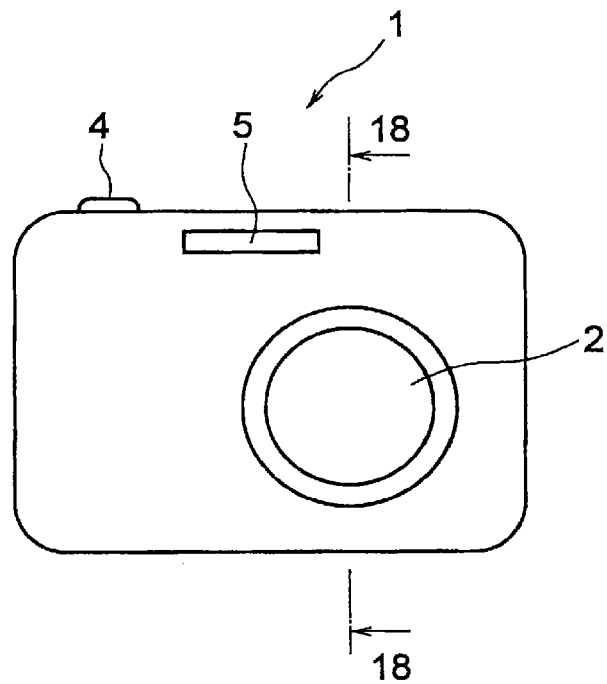
FIGS. 17A and 17B are schematic views showing an electronic still camera equipped with the variable magnification optical system relating to the first to fourth embodiments of the present invention.
Figure 17B:
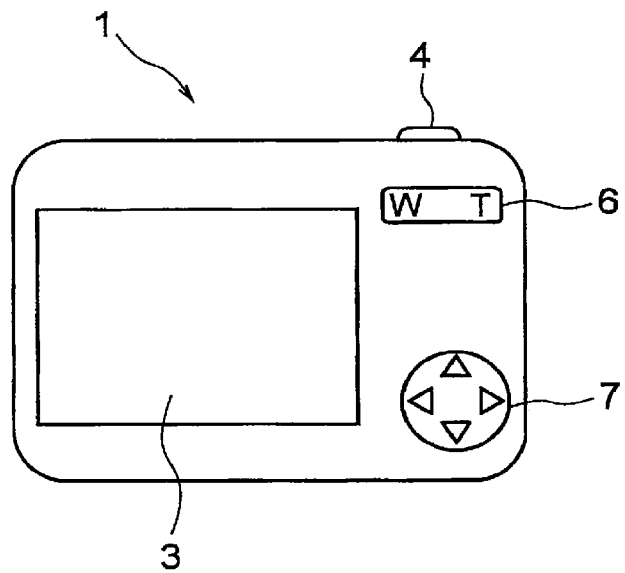
Figure 18:
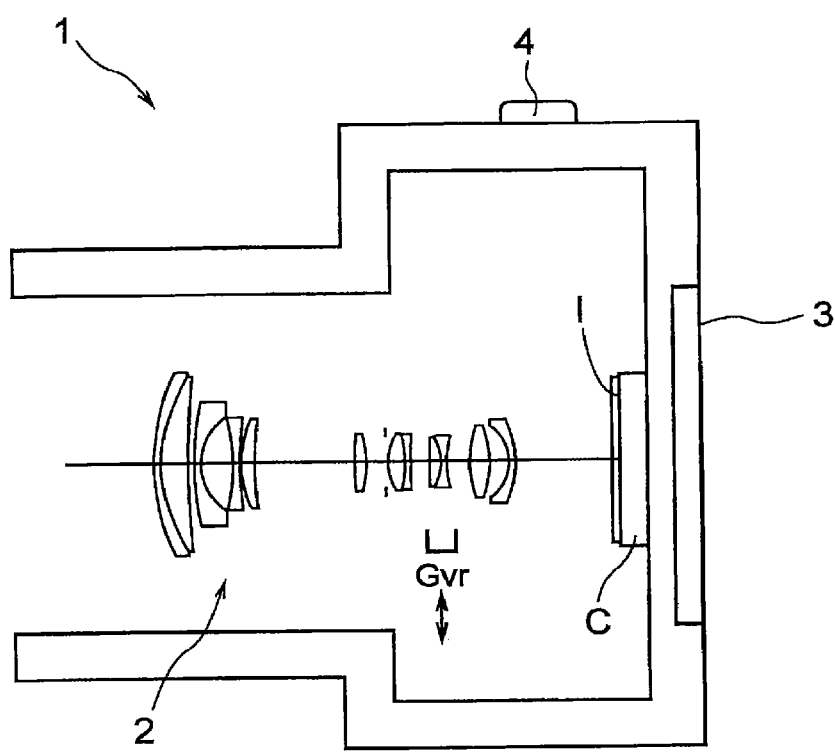
FIG. 18 is a sectional view of FIG. 17A along the line 18-18.

Next, a camera equipped with the variable magnification optical system relating to the first to fourth embodiments of the present invention is explained with reference to the accompanying drawings. FIGS. 17A and 17B are respective front and rear views showing an electronic still camera equipped with the variable magnification optical system relating to the first to fourth embodiments of the present invention. FIG. 18 is a sectional view of FIG. 17A along the line 18-18.

In FIGS. 17A, 17B and 18, an imaging lens 2 of an electronic still camera 1 (hereinafter called 'camera 1' simply) is provided with the variable magnification optical system ZL1 relating to the first Example. In the electronic still camera 1, at the pressing of an unillustrated power button, an unillustrated shutter of the imaging lens 2 is released, light emitted from an unillustrated object is converged by the imaging lens 2 and then focused on an imaging device C (such as CCD, CMOS or the like) disposed on the image plane I. An image of the object formed on the imaging device C is displayed on a liquid crystal monitor 3 provided on the back of the camera 1. A photographer determines a composition of a picture of the object, monitoring the liquid crystal monitor 3, and presses a release button 4 to take a picture of the object through the imaging device C and then record and store the picture in an unillustrated memory. At this time, when an unillustrated angular velocity sensor built in the camera 1 or an imaging lens barrel detects blurring of the camera 1 caused by a camera shake or the like, an unillustrated vibration reduction mechanism shifts the vibration reduction lens group Gvr within the 3b-th lens group G3b provided in the imaging lens 2, in a direction vertical to the optical axis of the imaging lens 2 to correct image blurring on the image plane I caused by the blurring of the camera 1.

Further, in the camera 1, there are prepared an auxiliary light emitting unit 5, which emits auxiliary light when the object is dark, a wide (W)—tele (T) button 6 for zooming the variable magnification optical system ZL1 as the imaging lens 2 from the wide angle end state (W) to the telephoto end state (T), a function button 7, which is used for setting various conditions for the camera 1, and so on.

In this manner, there is constructed the camera 1 having a high optical performance, in which the variable magnification optical system ZL1 relating to the first Example is built. Incidentally, the imaging lens 2 built in the camera 1 may be applied to a variable magnification optical system relating to any other Example. Further, as for the camera 1, whether a camera to which the imaging lens 2 is detachably mounted or a camera with which the imaging lens 2 is integrally formed may be employed. Further, whether a single lens reflex-type camera or a camera not provided with a quick return mirror or the like may be used.

Figure 19:
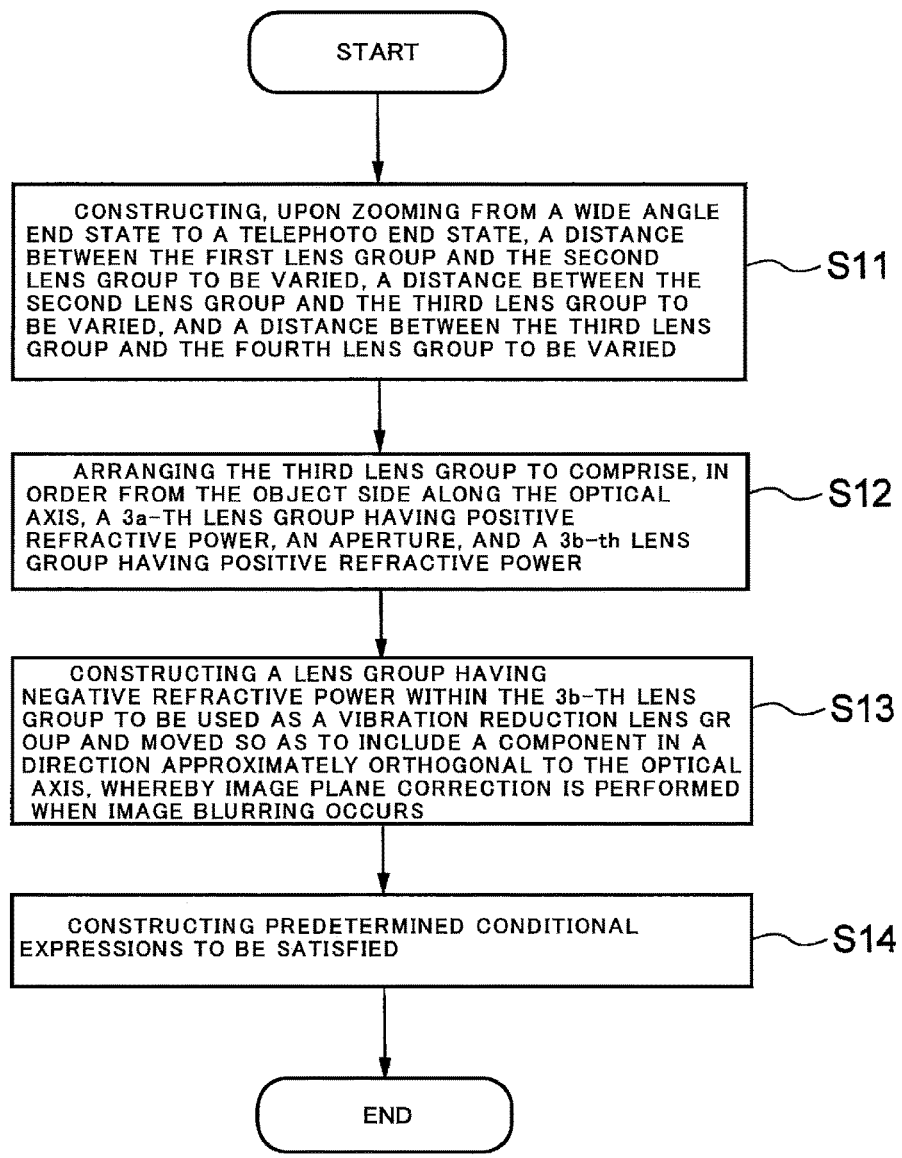
FIG. 19 is a view showing schematically a method for manufacturing a variable magnification optical system according to the first embodiment of the present invention.

Next, a method for manufacturing a variable magnification optical system relating to the first to fourth embodiments of the present application is described. FIG. 19 is a view showing schematically a method for manufacturing a variable magnification optical system according to the first embodiment of the present invention.

In the method for manufacturing the variable magnification optical system according to the first embodiment of the present invention, the variable magnification optical system comprises, in order from an object side along an optical axis, a first lens group having positive refractive power, a second lens group having negative refractive power, a third lens group having positive refractive power, and a fourth lens group. As shown in FIG. 19, the method comprises the following steps of S11 to S14:

Step S11: constructing such that, upon zooming from a wide angle end state to a telephoto end state, a distance between the first lens group and the second lens group is varied, a distance between the second lens group and the third lens group is varied, and a distance between the third lens group and the fourth lens group is varied.

Step S12: arranging the third lens group to comprise, in order from the object side along the optical axis, a 3a-th lens group having positive refractive power, an aperture, and a 3b-th lens group having positive refractive power.

Step S13: constructing such that a lens group having negative refractive power within the 3b-th lens group is used as a vibration reduction lens group and moved so as to include a component in a direction orthogonal to the optical axis, whereby image plane correction is performed when image blurring occurs.

Step S14: constructing such that the conditions of the following expressions are satisfied:

$$|f3b/f4|<2.00 \quad (1)$$

$$|fvr/f4|<1.00 \quad (2)$$

where f3b denotes a focal length of the 3b-th lens group, f4 denotes a focal length of the fourth lens group, and fvr denotes a focal length of the vibration reduction lens group.

Thus, the method for manufacturing the variable magnification optical system according to the first embodiment of the present application can manufacture a small-size variable magnification optical system having a high optical performance.

Figure 20:
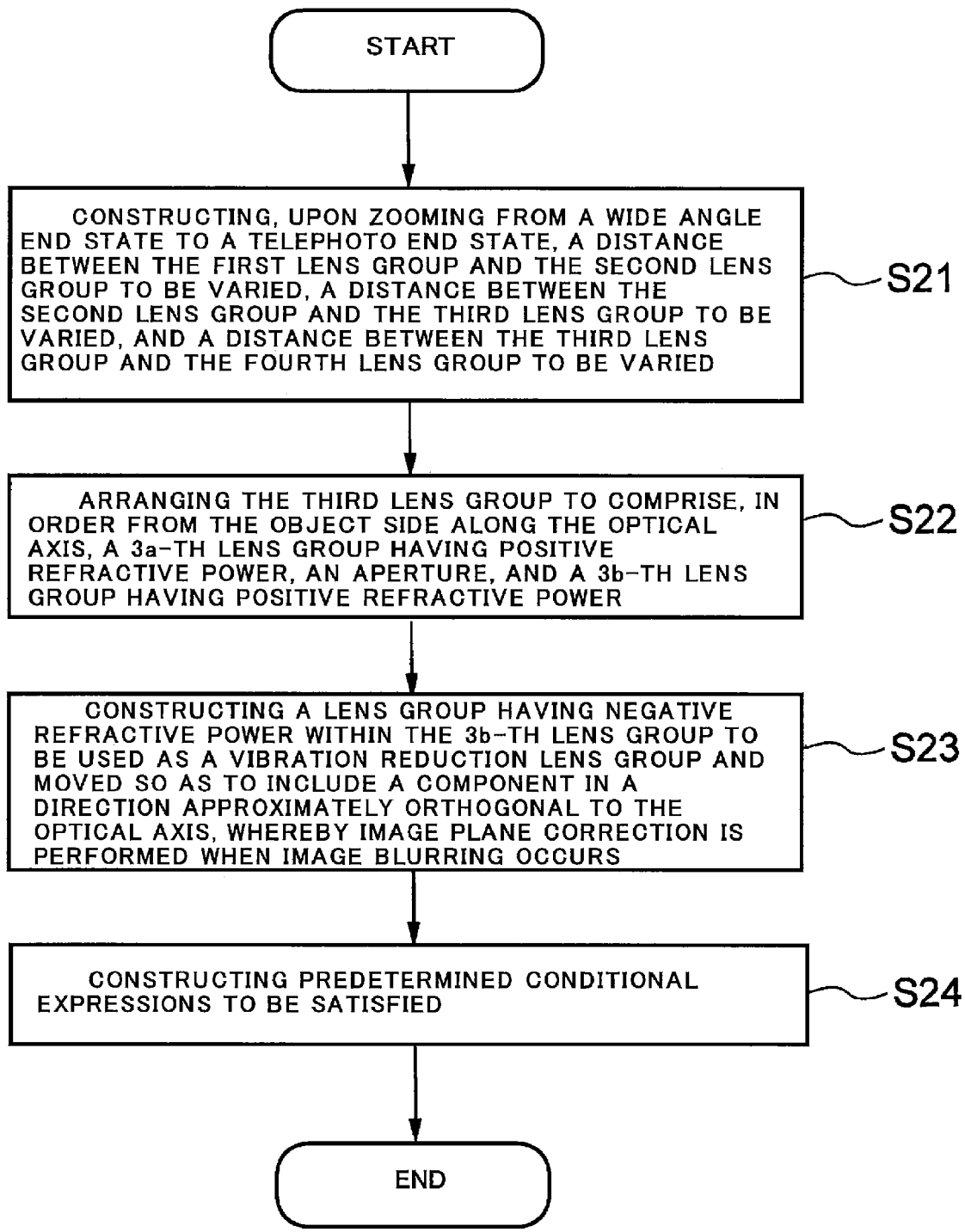
FIG. 20 is a view showing schematically a method for manufacturing a variable magnification optical system according to the second embodiment of the present invention.

FIG. 20 is a view showing schematically a method for manufacturing a variable magnification optical system according to the second embodiment of the present invention.

In the method for manufacturing the variable magnification optical system according to the second embodiment of the present invention, the variable magnification optical system comprises, in order from an object side along an optical axis, a first lens group having positive refractive power, a second lens group having negative refractive power, a third lens group having positive refractive power, and a fourth lens group. As shown in in FIG. 20, the method comprises the following steps of S21 to S24:

Step S21: constructing, upon zooming from a wide angle end state to a telephoto end state, the first lens group to be moved toward the object side with respect to an image plane along the optical axis, a distance between the first lens group and the second lens group to be varied, a distance between the second lens group and the third lens group to be varied, and a distance between the third lens group and the fourth lens group to be varied.

Step S22: arranging the third lens group to comprise, in order from the object side along the optical axis, a 3a-th lens group having positive refractive power, an aperture, and a 3b-th lens group having positive refractive power.

Step S23: constructing a lens group having negative refractive power within the 3b-th lens group to be used as a vibration reduction lens group and moved so as to include a component in a direction orthogonal to the optical axis, whereby image plane correction is performed when image blurring occurs.

Step S24: constructing the conditions of the following expressions to be satisfied:

$$|f3a/f4|<0.53 \quad (3)$$

$$|fvr/f4|<1.00 \quad (4)$$

where f3a denotes a focal length of the 3a-th lens group, f4 denotes a focal length of the fourth lens group, and fvr denotes a focal length of the vibration reduction lens group.

Thus, the method for manufacturing the variable magnification optical system according to the second embodiment of the present application can manufacture a small-size variable magnification optical system having a high optical performance.

Figure 21:
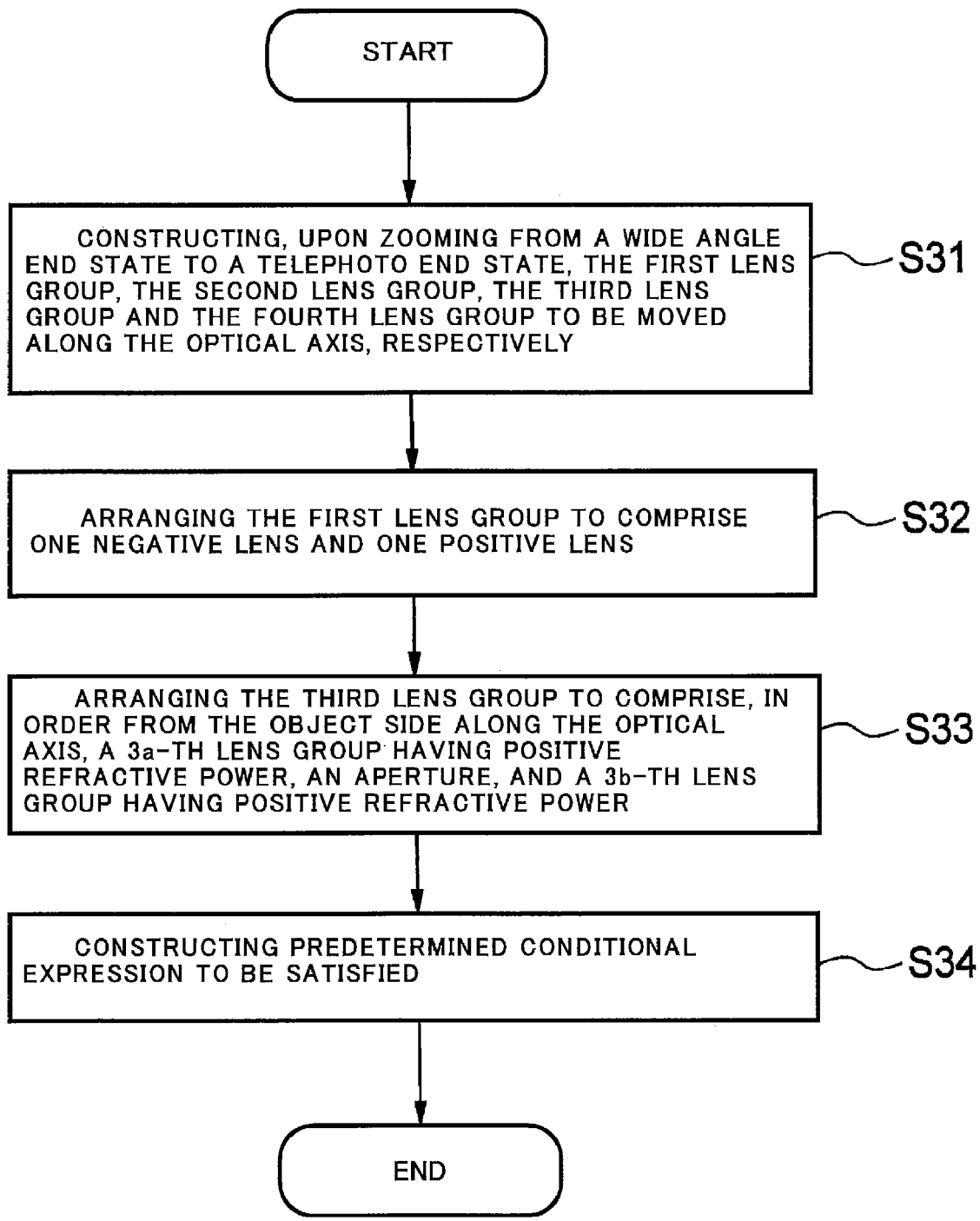
FIG. 21 is a view showing schematically a method for manufacturing a variable magnification optical system according to the third embodiment of the present invention.

FIG. 21 is a view showing schematically a method for manufacturing a variable magnification optical system according to the third embodiment of the present invention.

In the method for manufacturing the variable magnification optical system according to the third embodiment of the present invention, the variable magnification optical system comprises, in order from an object side along an optical axis, a first lens group having positive refractive power, a second lens group having negative refractive power, a third lens group having positive refractive power, and a fourth lens group. As shown in in FIG. 21, the method comprises the following steps of S31 to S34:

Step S31: constructing, upon zooming from a wide angle end state to a telephoto end state, the first lens group, the second lens group, the third lens group and the fourth lens group to be moved along the optical axis, respectively.

Step S32: arranging the first lens group to comprise one negative lens and one positive lens.

Step S33: arranging the third lens group to comprise, in order from the object side along the optical axis, a 3a-th lens group having positive refractive power, an aperture, and a 3b-th lens group having positive refractive power.

Step S34: constructing the condition of the following expression to be satisfied:

$$|f3a/f4|<0.540 \quad (5)$$

where f3a denotes a focal length of the 3a-th lens group, and f4 denotes a focal length of the fourth lens group.

Thus, the method for manufacturing the variable magnification optical system according to the third embodiment of the present application can manufacture a small-size variable magnification optical system having a high optical performance.

Figure 22:
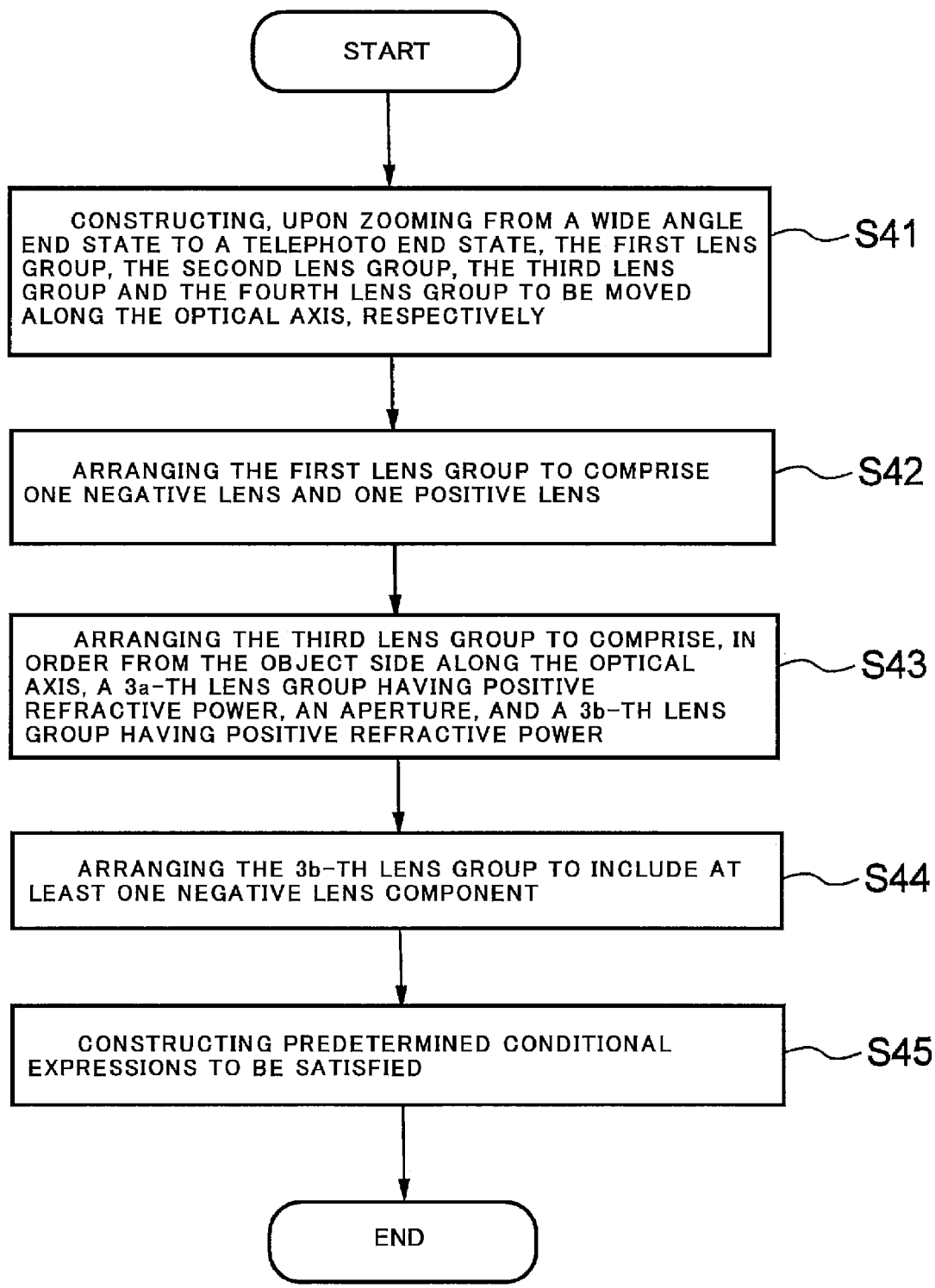
FIG. 22 is a view showing schematically a method for manufacturing a variable magnification optical system according to the fourth embodiment of the present invention.

FIG. 22 is a view showing schematically a method for manufacturing a variable magnification optical system according to the fourth embodiment of the present invention.

In the method for manufacturing the variable magnification optical system according to the fourth embodiment of the present invention, the variable magnification optical system comprises, in order from an object side along an optical axis, a first lens group having positive refractive power, a second lens group having negative refractive power, a third lens group having positive refractive power, and a fourth lens group. As shown in in FIG. 22, the method comprises the following steps of S41 to S45:

Step S41: constructing, upon zooming from a wide angle end state to a telephoto end state, the first lens group, the second lens group, the third lens group and the fourth lens group to be moved along the optical axis, respectively.

Step S42: arranging the first lens group to comprise one negative lens and one positive lens.

Step S43: arranging the third lens group to comprise, in order from the object side along the optical axis, a 3a-th lens group having positive refractive power, an aperture, and a 3b-th lens group having positive refractive power.

Step S44: arranging the 3b-th lens group to include at least one negative lens component.

Step S45: constructing the conditions of the following expressions to be satisfied:

$$|f3a/f4|<1.00 \quad (9)$$

$$0.700<(-f3bn)/f3a<1.500 \quad (8)$$

where f3a denotes a focal length of the 3a-th lens group, f4 denotes a focal length of the fourth lens group, and f3bn denotes a focal length of the negative lens component on the most image side within the 3b-th lens group.

Thus, the method for manufacturing the variable magnification optical system according to the fourth embodiment of the present application can manufacture a small-size variable magnification optical system having a high optical performance.

What is claimed is:

1. A variable magnification optical system comprising, in order from an object side along an optical axis, a first lens group having positive refractive power, a second lens group having negative refractive power, a third lens group having positive refractive power, and a fourth lens group;

upon zooming from a wide angle end state to a telephoto end state, the first lens group, the second lens group, the third lens group and the fourth lens group being moved along the optical axis, respectively;

the first lens group comprising one negative lens and one positive lens;

the third lens group comprising, in order from the object side along the optical axis, a 3a-th lens group having positive refractive power, an aperture, and a 3b-th lens group having positive refractive power; and the conditions of the following expressions being satisfied:

$$|f3a/f4|<0.540$$

$$|f3b/f4|<1.00$$

where f3a denotes a focal length of the 3a-th lens group, f4 denotes a focal length of the fourth lens group, and f3b denotes a focal length of the 3b-th lens group.

2. A variable magnification optical system according to claim 1, wherein the condition of the following expression is satisfied:

$$0.100<f3a/f3b<0.700.$$

3. A variable magnification optical system according to claim 1, wherein the 3b-th lens group comprises at least one negative lens component, and the condition of the following expression is satisfied:

$$0.700<(-f3bn)/f3a<1.500$$

where f3bn denotes a focal length of the negative lens component on the most image side within the 3b-th lens group.

4. An imaging apparatus equipped with the variable magnification optical system according to claim 1.

5. A variable magnification optical system comprising, in order from an object side along an optical axis, a first lens group having positive refractive power, a second lens group having negative refractive power, a third lens group having positive refractive power, and a fourth lens group;

upon zooming from a wide angle end state to a telephoto end state, the first lens group, the second lens group, the third lens group and the fourth lens group being moved along the optical axis, respectively;

the first lens group comprising one negative lens and one positive lens;

the third lens group comprising, in order from the object side along the optical axis, a 3a-th lens group having positive refractive power, an aperture, and a 3b-th lens group having positive refractive power;

the 3b-th lens group comprising at least one negative lens component; and the conditions of the following expressions being satisfied:

$$|f3a/f4|<1.00$$

$$0.700<(-f3bn)/f3a<1.500$$

where f3a denotes a focal length of the 3a-th lens group, f4 denotes a focal length of the fourth lens group, and f3bn denotes a focal length of the negative lens component on the most image side within the 3b-th lens group.

6. A variable magnification optical system according to claim 5, wherein the condition of the following expression is satisfied:

$$0.100 < f3a/f3b < 0.700$$

where f3b denotes a focal length of the 3b-th lens group.

7. A variable magnification optical system according to claim 5, wherein the condition of the following expression is satisfied:

$$|f3b/f4| < 1.00$$

where f3b denotes a focal length of the 3b-th lens group.

8. An imaging apparatus equipped with the variable magnification optical system according to claim 5.

9. A method for manufacturing a variable magnification optical system comprising, in order from an object side along an optical axis, a first lens group having positive refractive power, a second lens group having negative refractive power, a third lens group having positive refractive power, and a fourth lens group;
the method comprising:
constructing, upon zooming from a wide angle end state to a telephoto end state, the first lens group, the second lens group, the third lens group and the fourth lens group to be moved along the optical axis, respectively;
arranging the first lens group to comprise one negative lens and one positive lens;
arranging the third lens group to comprise, in order from the object side along the optical axis, a 3a-th lens group having positive refractive power, an aperture, and a 3b-th lens group having positive refractive power; and
constructing so as to satisfy the conditions of the following expressions:

$$|f3a/f4| < 0.540$$

$$|f3b/f4| < 1.00$$

where f3a denotes a focal length of the 3a-th lens group, f4 denotes a focal length of the fourth lens group, and f3b denotes a focal length of the 3b-th lens group.

10. A method for manufacturing a variable magnification optical system, according to claim 9, including constructing so as to satisfy the condition of the following expression:

$$0.100 < f3a/f3b < 0.700.$$

11. A method for manufacturing a variable magnification optical system, according to claim 9, wherein the 3b-th lens group is arranged to comprise at least one negative lens component, and further including constructing so as to satisfy the condition of the following expression:

$$0.700 < (-f3bn)/f3a < 1.500$$

where f3bn denotes a focal length of the negative lens component on the most image side within the 3b-th lens group.

12. A method for manufacturing a variable magnification optical system comprising, in order from an object side along an optical axis, a first lens group having positive refractive power, a second lens group having negative refractive power, a third lens group having positive refractive power, and a fourth lens group;
the method comprising:
constructing, upon zooming from a wide angle end state to a telephoto end state, the first lens group, the second lens group, the third lens group and the fourth lens group to be moved along the optical axis, respectively;
arranging the first lens group to comprise one negative lens and one positive lens;
arranging the third lens group to comprise, in order from the object side along the optical axis, a 3a-th lens group having positive refractive power, an aperture, and a 3b-th lens group having positive refractive power;
arranging the 3b-th lens group to include at least one negative lens component; and
constructing so as to satisfy the conditions of the following expressions:

$$|f3a/f4| < 1.00$$

$$0.700 < (-f3bn)/f3a < 1.500$$

where f3a denotes a focal length of the 3a-th lens group, f4 denotes a focal length of the fourth lens group, and f3bn denotes a focal length of the negative lens component on the most image side within the 3b-th lens group.

13. A method for manufacturing a variable magnification optical system, according to claim 12, including constructing so as to satisfy the condition of the following expression:

$$0.100 < f3a/f3b < 0.700$$

where f3b denotes a focal length of the 3b-th lens group.

14. A method for manufacturing a variable magnification optical system, according to claim 12, including constructing so as to satisfy the condition of the following expression:

$$|f3b/f4| < 1.00$$

where f3b denotes a focal length of the 3b-th lens group.

* * * * *